Jan. 27, 1970      S. G. ISSERSTEDT      3,491,870
VENDING MACHINE WITH SIMULTANEOUS DISPENSING MEANS
Filed Aug. 31, 1967      14 Sheets-Sheet 1

INVENTOR
SIEGFRIED G. ISSERSTEDT
By: Smart & Biggar
ATTORNEYS

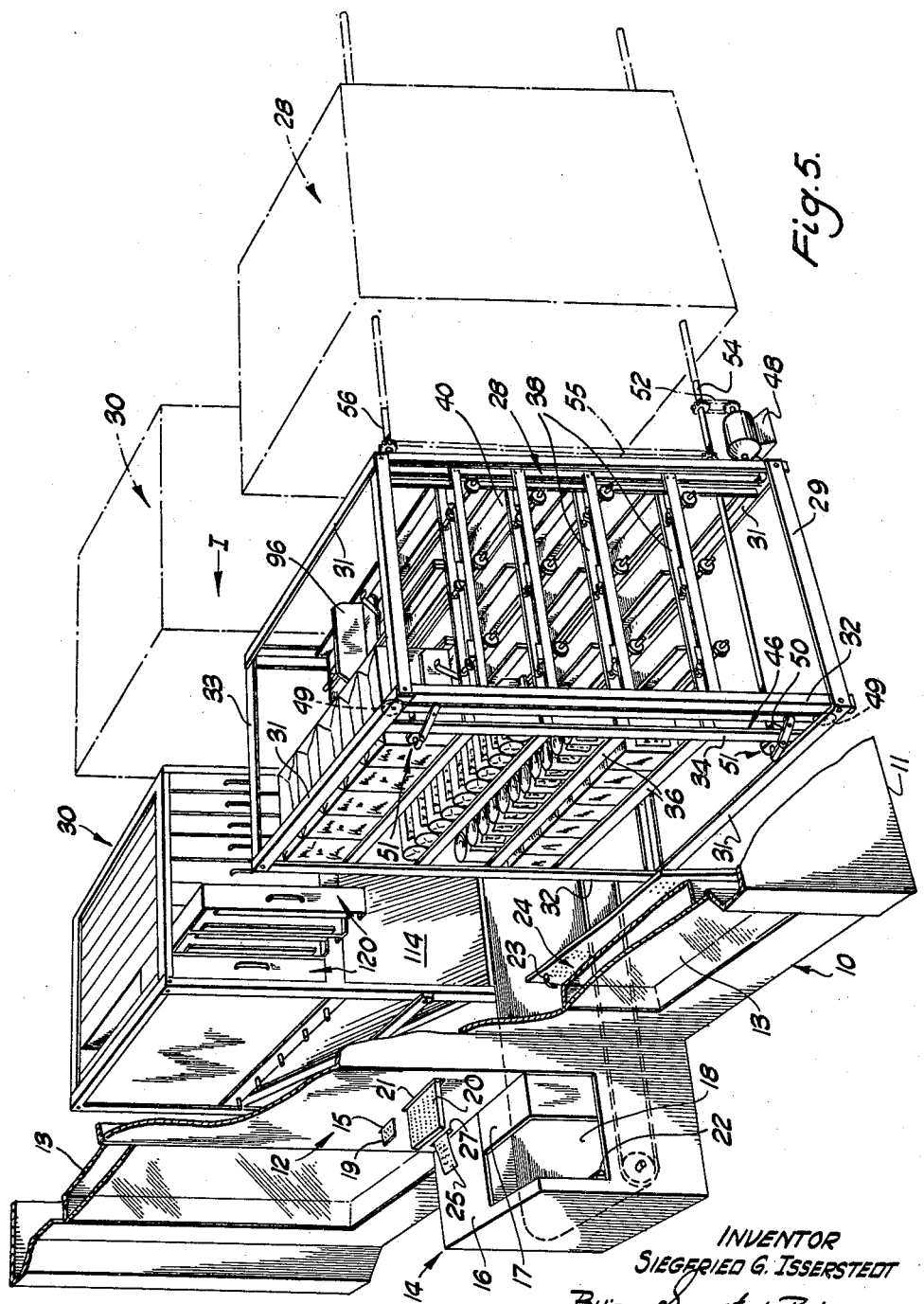

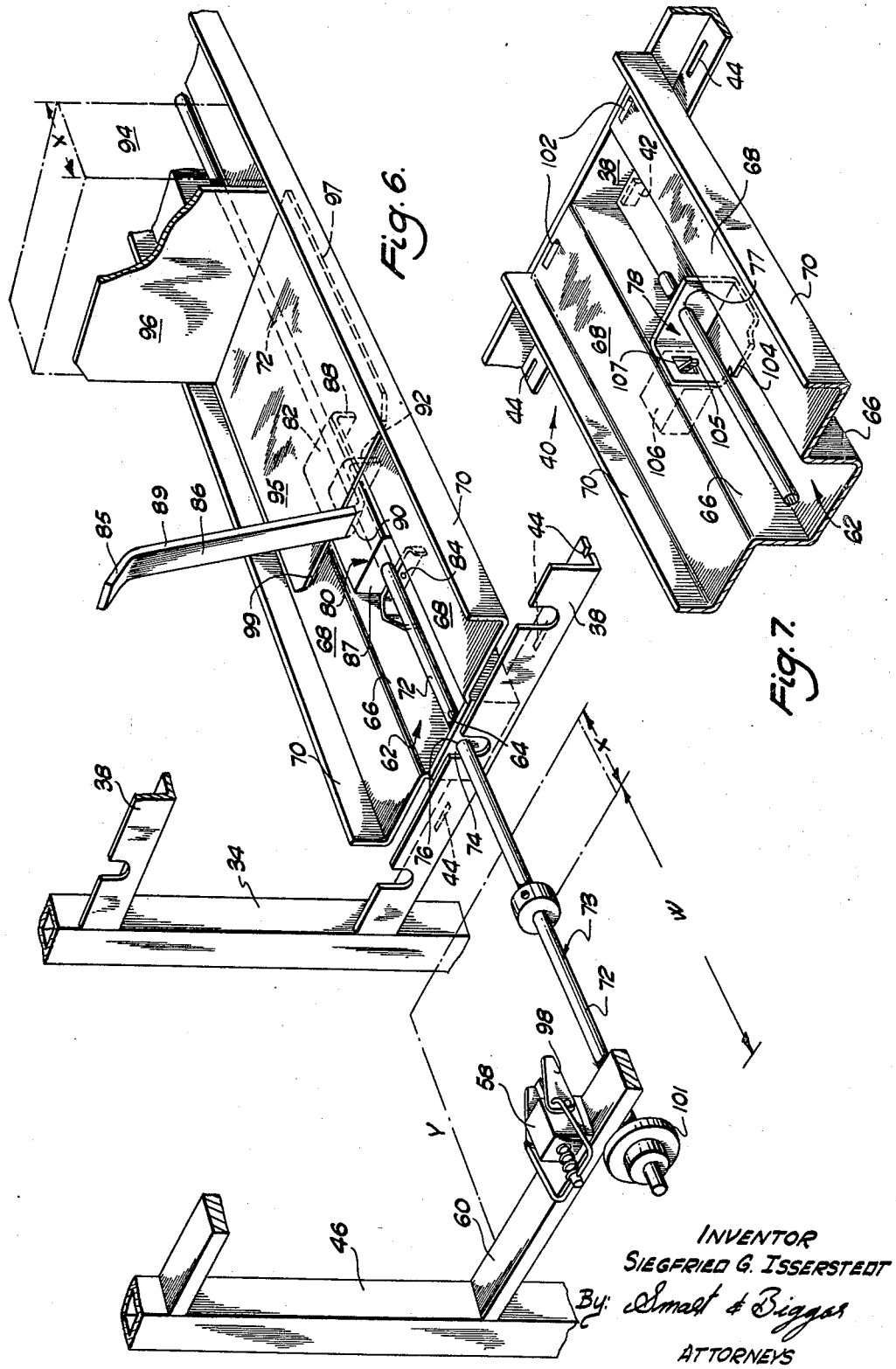

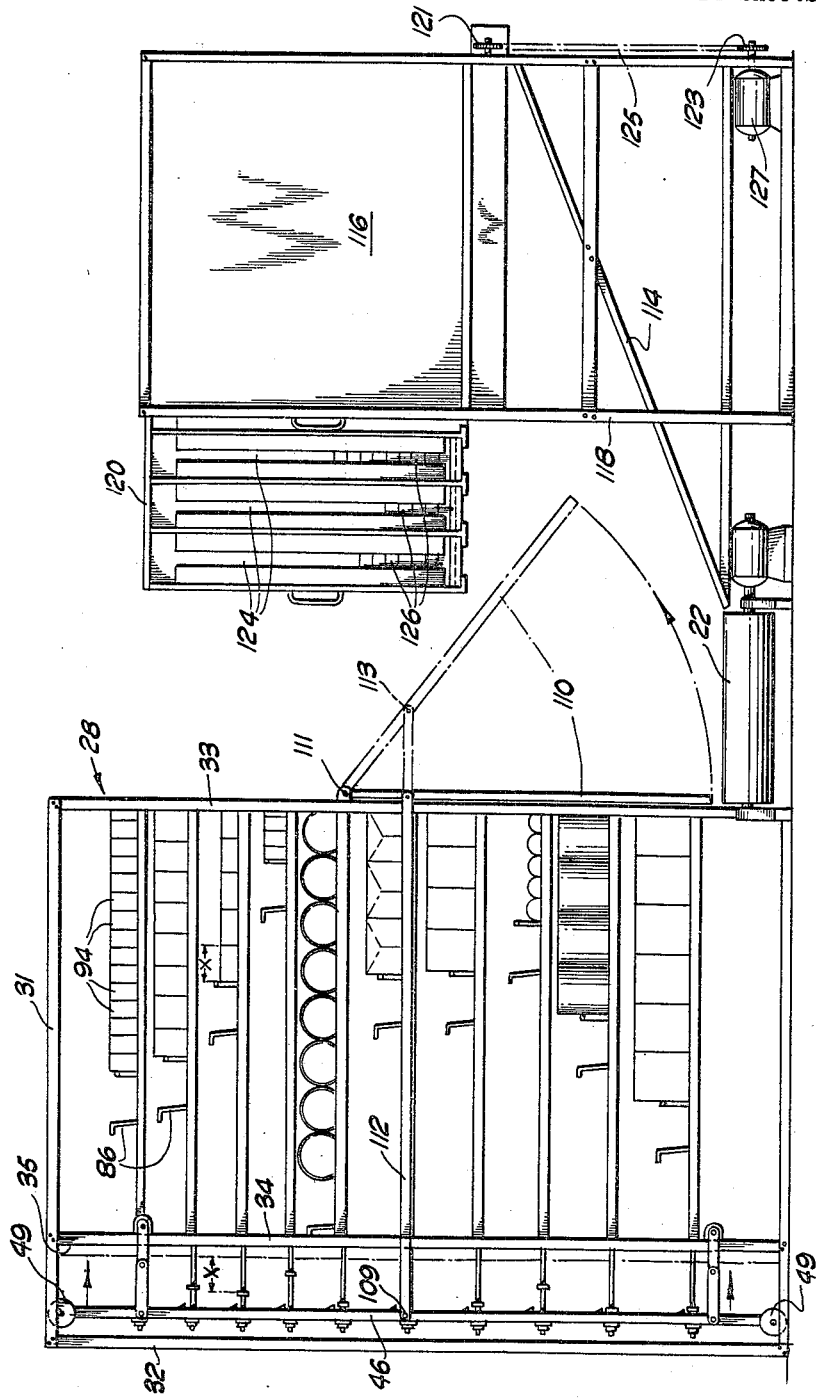

Jan. 27, 1970　　　S. G. ISSERSTEDT　　　3,491,870
VENDING MACHINE WITH SIMULTANEOUS DISPENSING MEANS
Filed Aug. 31, 1967　　　　　　　　　　　　　14 Sheets-Sheet 6

INVENTOR
SIEGFRIED G. ISSERSTEDT
By: Smart & Biggar
ATTORNEYS

Jan. 27, 1970  S. G. ISSERSTEDT  3,491,870
VENDING MACHINE WITH SIMULTANEOUS DISPENSING MEANS
Filed Aug. 31, 1967  14 Sheets-Sheet 7

INVENTOR
SIEGFRIED G. ISSERSTEDT
By: Smart & Biggar
ATTORNEYS

Jan. 27, 1970  S. G. ISSERSTEDT  3,491,870
VENDING MACHINE WITH SIMULTANEOUS DISPENSING MEANS
Filed Aug. 31, 1967  14 Sheets-Sheet 8

INVENTOR
SIEGFRIED G. ISSERSTEDT
By: Smart & Biggar
ATTORNEYS

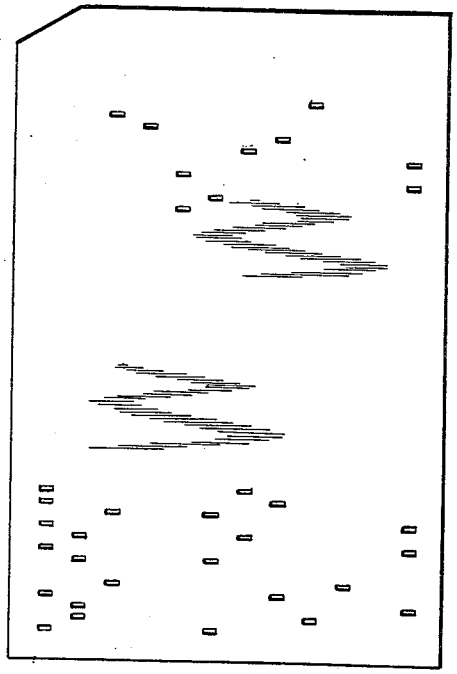
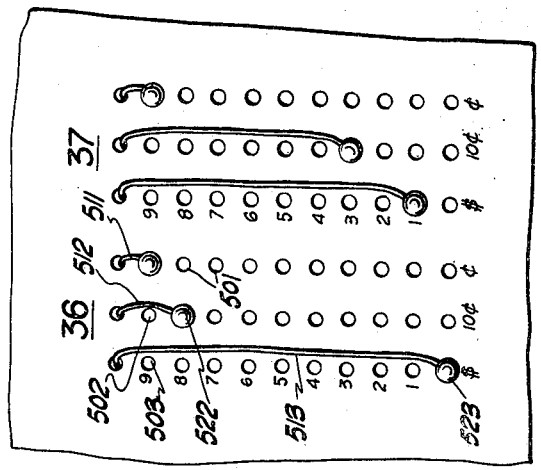
Fig. 19.
Fig. 26.
Fig. 27.
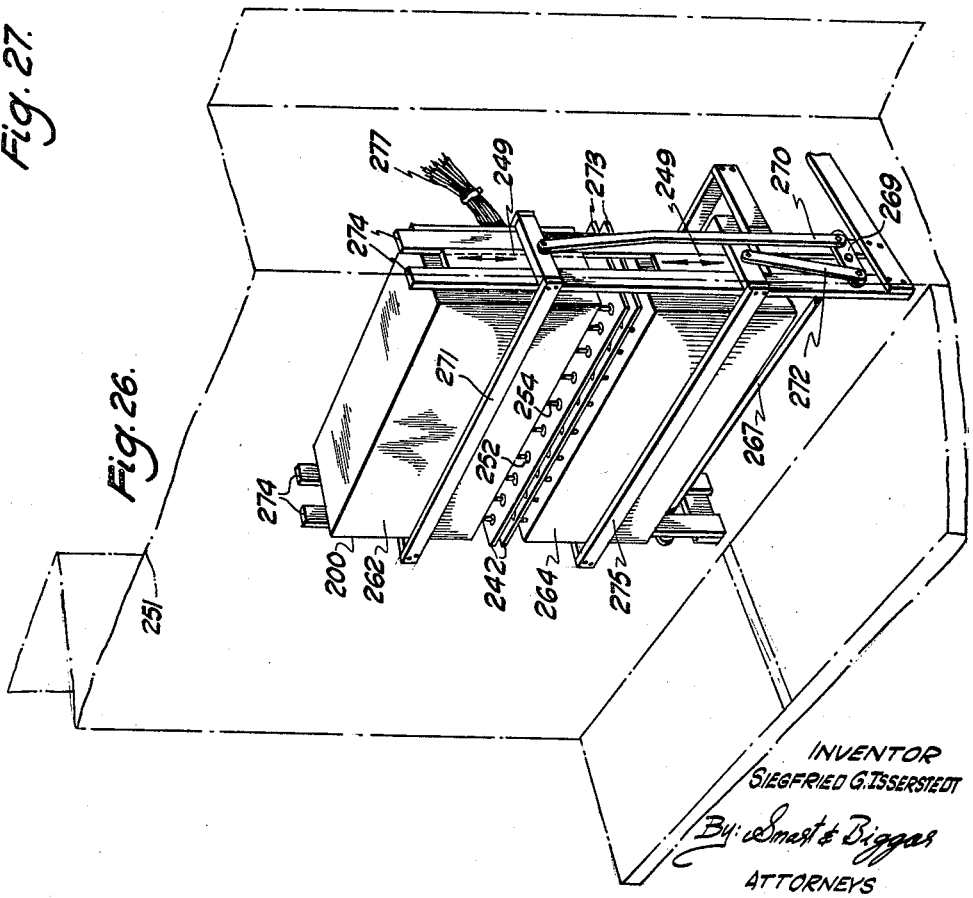
INVENTOR
SIEGFRIED G. ISSERSTEDT
By: Smart & Biggar
ATTORNEYS Jan. 27, 1970  S. G. ISSERSTEDT  3,491,870
VENDING MACHINE WITH SIMULTANEOUS DISPENSING MEANS
Filed Aug. 31, 1967  14 Sheets-Sheet 14
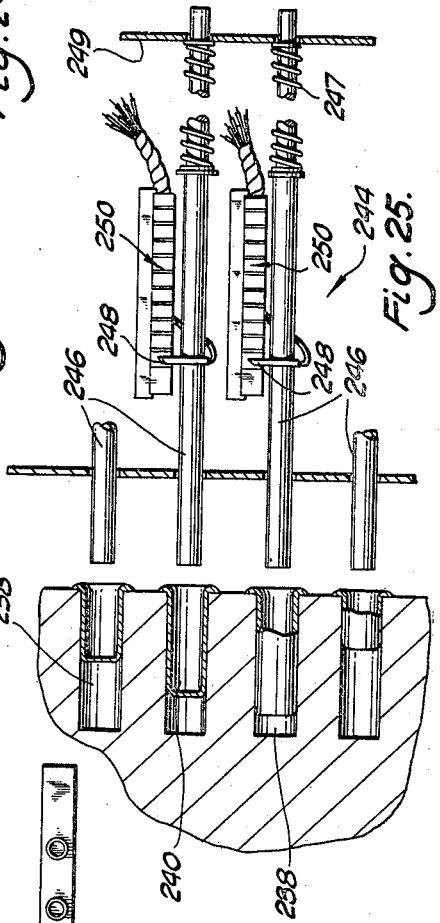
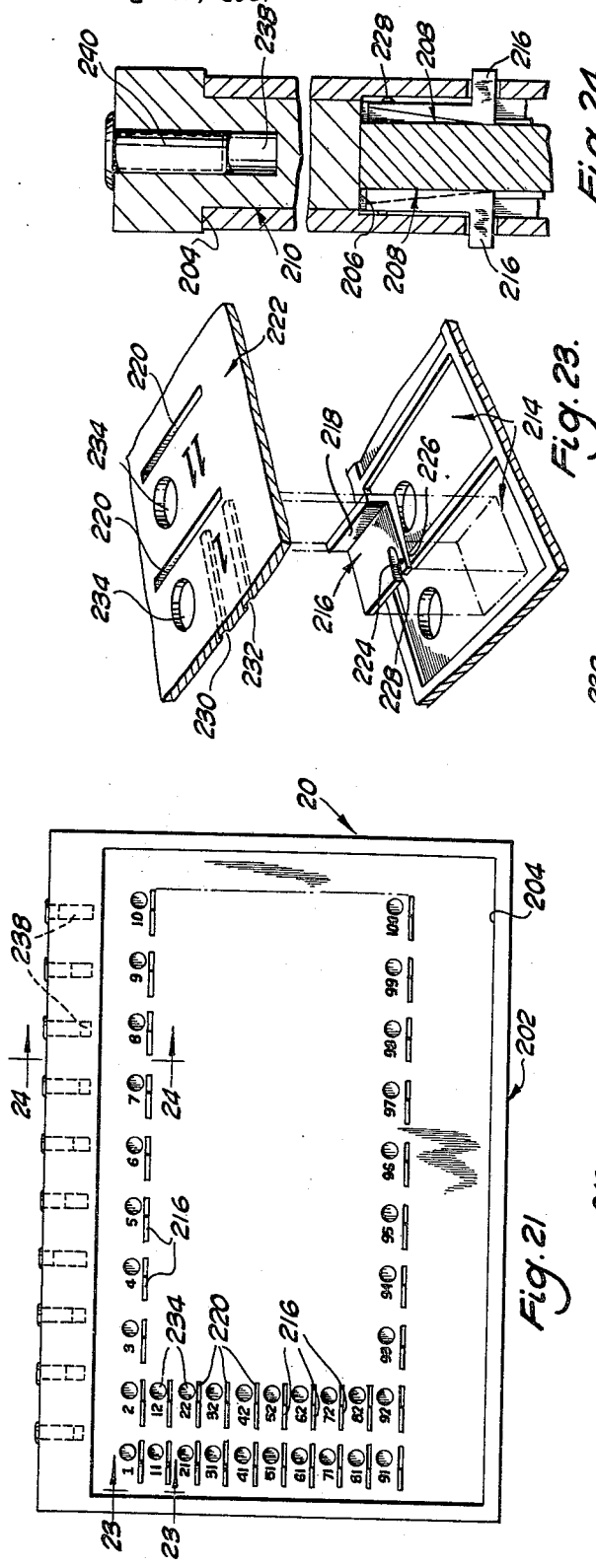
INVENTOR
SIEGFRIED G. ISSERSTEDT
By: Smart & Bigger
ATTORNEYS United States Patent Office 3,491,870
Patented Jan. 27, 1970

3,491,870
VENDING MACHINE WITH SIMULTANEOUS
DISPENSING MEANS
Siegfried G. Isserstedt, 106 Poplar Plains Road,
Toronto, Ontario, Canada
Filed Aug. 31, 1967, Ser. No. 664,811
Int. Cl. G07f 1/06
U.S. Cl. 194—4
41 Claims

ABSTRACT OF THE DISCLOSURE

Automated vending apparatus for dispensing and billing for a variety of products of different sizes and shapes, having a storage device for each product, a dispensing device for each storage device, a customer-actuated switch for operating each dispensing device to dispense those products selected by the customer, and an accounting device for summing and presenting a bill for the prices of the products selected by the customer. Optionally, a customer identification device for recording the customer's identity on the bill and later billing.

BACKGROUND OF THE INVENTION

The present invention relates to vending apparatus.

In the operation of conventional vending apparatus, the purchaser is able to select one of a plurality of products, usually of more or less uniform sizes and shapes, stored in and vendible from the apparatus. The purchaser is required to insert coins or tokens, sometimes in conjunction with the actuation of a selector button, lever or the like, thereby starting the vending process, the result of which is the dispensing of the selected article to the purchaser. However, apparatus of the type presently known in the art is inappropriate for installations in which a large variety of products of different sizes and shapes are required to be dispensed. Furthermore, where a purchaser may be expected to select a considerable number of such articles, he would be required to have with him coinage or tokens of nearly all denominations in substantial quantities in order to actuate the several conventional vending machines that would be necessary in order to meet the purchaser's demands.

The present invention is directed to vending apparatus capable of vending a large variety of products of different sizes and shapes, which is convenient to the purchaser, requires few personnel and, when used in conjunction with the security control device described in applicant's copending application Ser. No. 533,682, now abandoned, has appropriate safeguards to prevent deliberate or accidental irregularities in the use of the vending apparatus by purchasers. The vending apparatus proposed herein is contemplated for use, for example in automated grocery stores or supermarkets in which a large variety of products differing widely in size, shape and manner of packaging must be made available to the purchaser.

It is accordingly an object of the present invention to provide vending apparatus capable of vending a large variety of mechandise of different sizes and shapes.

It is another object of the present invention to provide vending apparatus that will permit selection of a multiplicity of articles at one time and will vend the same to the purchaser in a single automated series of operations.

It is a further object of the present invention to provide vending apparatus that will, after the goods to be vended are selected by the purchaser, dispense the same to the purchaser and at the same time record the price of the items vended and provide a means for billing the purchaser for the articles dispensed.

It is a further object of the present invention to provide vending apparatus in which a single vending operation suffices to dispense, substantially simultaneously, one of each of a number of selected items of different sizes and shapes.

It is a further object of the invention to provide vending apparatus as aforesaid in which the price of each item of merchandise can be adjustably pre-set by the operator of the apparatus, and the purchaser billed accordingly.

It is a further object of the invention to provide automatic vending apparatus in conjunction with customer identification means which will enable the customer to purchase articles on a credit basis.

SUMMARY OF THE INVENTION

To achieve the above and other objects, the present invention provides a plurality of merchandise storage units, of the type adapted to dispense one or more items of merchandise simultaneously upon the imparting of a dispensing movement to a dispensing member associated with each merchandise storage unit. Dispense control means associated with each of the storage units is also provided for rendering the associated dispensing member operative or inoperative in respect of the storage unit with which it is associated. Associated with each dispense control means is selector means adapted to conform the condition (i.e., "operative" or "inoperative") of all the dispense control means to the condition (i.e., "selected" or "not selected") of the corresponding selector means. The selector means are actuated by a selector control device operable by the purchaser. The vending machine further comprises adjustable price control means which can be manually adjusted by the operator of the vending apparatus, whereby the price of each item of merchandise may be pre-set. The vending machine further comprises recording means such as printing means and invoice control means associated with the recording means and the price control means adapted to record and preferably print consecutively the identity and the price of each item of merchandise selected in conformity with the selection registered by the purchaser in the selector control device. The printing means further prints the total of the prices of the selected goods to provide an invoice for the selected merchandise. The vending machine further comprises power-operated means for imparting the dispensing movement to the dispensing members associated with all selected merchandise storage units simultaneously. The invoice control means is responsive to the selector control device so that selected merchandise is dispensed and an invoice printed simultaneously. In a preferred embodiment of the invention, conveyor means is provided to collect the dispensed merchandise and transport it to a receiving station accessible to the purchaser of the merchandise.

It is contemplated that the vending merchandise may be charged to the account of the purchaser or, if the operator of the vending apparatus prefers, the invoice may be immediately presented for payment to a clerk at the receiving station or at some other appropriate location.

SUMMARY OF THE DRAWINGS

In the drawings,

FIGURE 5 is a cut-away perspective view of dispensing apparatus according to the invention and particularly of two different types of merchandise dispensers according to the invention cooperating with a conveyor placed between them;

FIGURE 6 is a perspective view of a single magazine of one of the two types of dispenser shown in FIGURE 1;

FIGURE 7 is a detailed perspective view of one end of the magazine illustrated in FIGURE 6;

FIGURE 8 is a side view of the two types of dispensing apparatus shown in FIGURE 5;

FIGURE 19 (on the same sheet as FIGURES 26 and 27) is a fragmentary view of a price panel used for adjusting the price of each item of merchandise vended by the vending apparatus;

FIGURE 21 is an elevation view of a selector card for use in association with one embodiment of a vending machine constructed according to the present invention;

FIGURE 22 is a plan view of the selector card shown in FIGURE 21;

FIGURE 23 is a detailed exploded view of a fragment of the selector card illustrated in FIGURE 21;

FIGURE 24 is an enlarged fragmentary end view, in section, of the card shown in FIGURE 21;

FIGURE 25 is an enlarged fragmentary view of a portion of the selector card illustrated in FIGURE 21 and of a portion of the cooperating purchaser identification means associated with one embodiment of vending apparatus constructed according to the present invention;

FIGURE 26 is a perspective view of purchaser identification and selection sensing mechanism for use with the selector card shown in FIGURE 21;

FIGURE 27 illustrates a punched card for use as a purchaser identification card;

FIGURE 29 (on the same sheet as FIGURE 16) illustrates a push-button panel for use as a selector control device in one embodiment of vending apparatus according to the invention.

DESCRIPTION OF PREFERRED EMBODIMENTS WITH REFERENCE TO THE DRAWINGS

The overall concept of the invention

Figure 1:
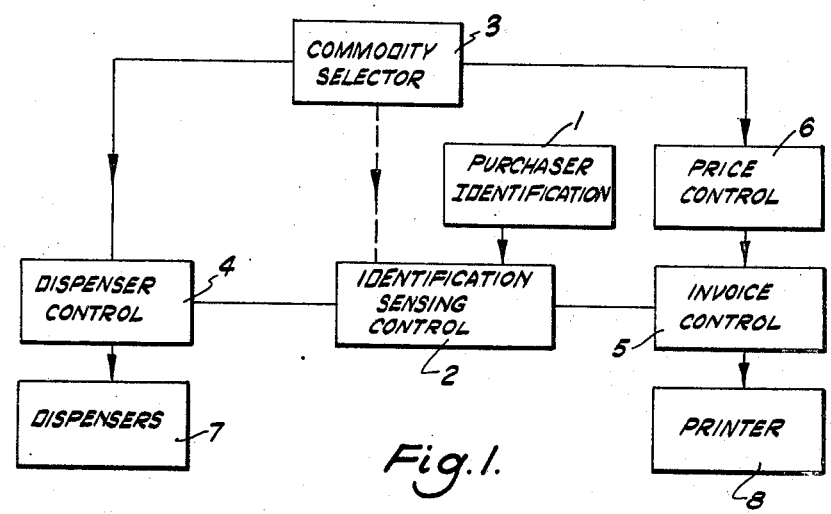
FIGURE 1 is a schematic block diagram illustrating the interrelationship of the subunits of vending apparatus according to the invention.

FIGURE 1 illustrates in flow-chart form the vending system provided by the present invention. Where the purchaser is to be individually billed, he is provided with identification means 1 which is sensed by an identification sensing device 2. The sensing device 2 is preferably a security control device of the type described in applicant's United States patent application Ser. No. 533,682, filed Mar. 11, 1966. The purchaser selects those products that he desires to purchases by registering appropriate selections in a commodity selector control device 3. In some embodiments of the invention, the commodity selector control device is provided in combination with the purchaser identification means; therefore, for such embodiments the identification sensing device 2 is directly responsive to the commodity selector control device 3, as indicated by the broken line on the flow chart.

Where the vending apparatus is intended to operate on a cash basis exclusively, and no restriction on the persons using the apparatus is contemplated, the identification sensing means 2 and the purchaser identification device 1 may be eliminated.

The purchaser's selection, registered in the commodity selector control device 3, is transmitted to a dispenser control device 4 and an invoice control device 5. The dispenser control device 4 and invoice control device 5 are also responsive to the identification sensing device 2 so that no dispensing or invoicing commences unless the identification sensing device 2 senses that the purchaser has been satisfactorily identified and that there are no irregularities in the identification. If the security control device described in applicant's patent application Ser. No. 533,682 is used, the dispensing and invoicing operations would not commence until relay 62 shown in FIGURE 1 of the said patent application is energized.

Because the prices of the commodities may be expected to fluctuate, a price control device 6 is preferably provided between the commodity selector control means 3 and the invoice control means 5 so that the operator of the vending apparatus can from time to time adjust the prices of the commodities dispensed.

The dispenser control means 4 actuates dispensers 7 in accordance with the selection registered in the commodity selector control means 3. At the same time, the printer 8 actuated by the invoice control means 5 prints the price and quantity of each item selected and also the total number of products selected and the total amount owing for the products selected.

Figure 2:
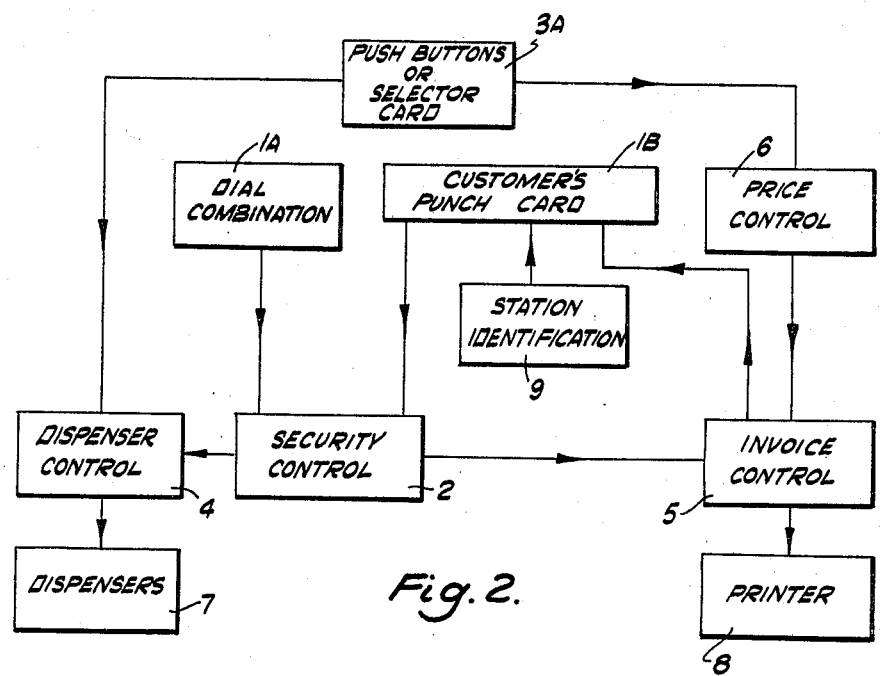
FIGURE 2 is a schematic block diagram illustrating a modification of the diagram of FIGURE 1.

FIGURE 2 illustrates in flow-chart form one embodiment of a vending system according to FIGURE 1. In this system, the purchaser identification means comprises a dial combination 1A and a customer's punch card 1B, to each of which the identification sensing means 2 (in this case the security control device 2) is responsive. It is contemplated that each customer will be provided with a plurality of punch cards 1B and will utilize a single card each time a purchase is made. The punch card is retained by the vending machine for accounting purposes, and the customer is provided with an invoice printed by the printer 8. In order to start the vending operation, the purchaser must insert into an appropriate sensing device a punch card bearing information indicative of the purchaser's identity. At the same time, the customer has in his memory a dial combination that also serves to identify him, and must register upon appropriate dials located near the selector control device his own unique dial combination, which is matched by a portion of the identification information on the punch card 1B. If a dial combination 1A and punch card 1B satisfactory to identify the consumer are registered in the security control device 2, then the commodity selection registered on appropriate push-buttons or selector card 3A will be transmitted to the dispenser control device 4 and invoice control device 5, and the vending operation proceeds as described with reference to FIGURE 1.

If the purchaser is able to utilize his dial combination and identifying punch card at more than one vending station, a station-identification device 9 may be provided to punch the customer's punch card 1B with the identity of the station. This ensures that the correct station will be reimbursed for the purchases made at that station.

Figure 3:
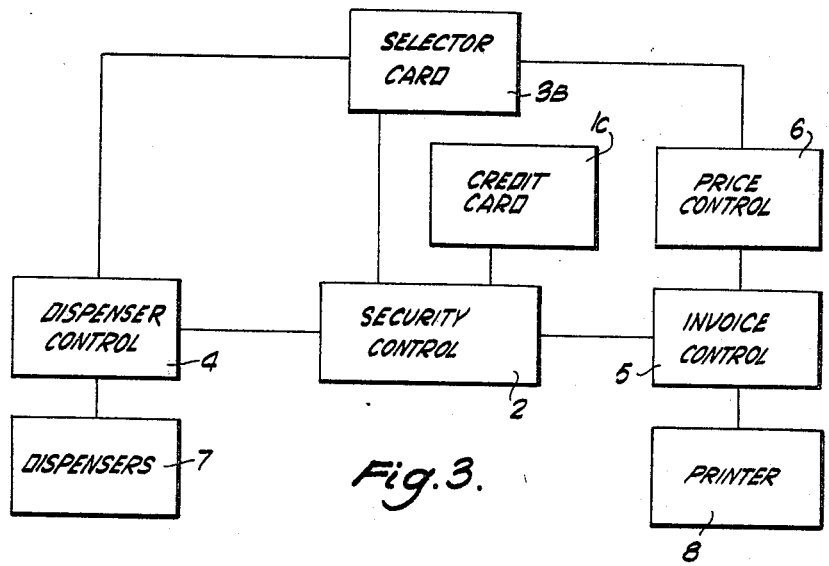
FIGURE 3 is a schematic block diagram illustrating a further modification of the diagram of FIGURE 1.

FIGURE 3 illustrates a further modification of the system shown in FIGURE 1. In this case the purchaser is provided with a credit card 1C and a selector card 3B, the latter, in addition to providing the means of registering the customer's selection of merchandise, also bearing information indicative of the identity of the customer. In order to actuate the vending operation, the credit card 1C and the selector card 3B must be sensed by appropriate sensing devices, cooperating with the security control device 2. If the security control device 2 confirms that the identification information on credit card 1C is correctly matched to the identification information on the selector card 3B, then the vending operation may proceed as described with reference to FIGURE 1.

Figure 4:
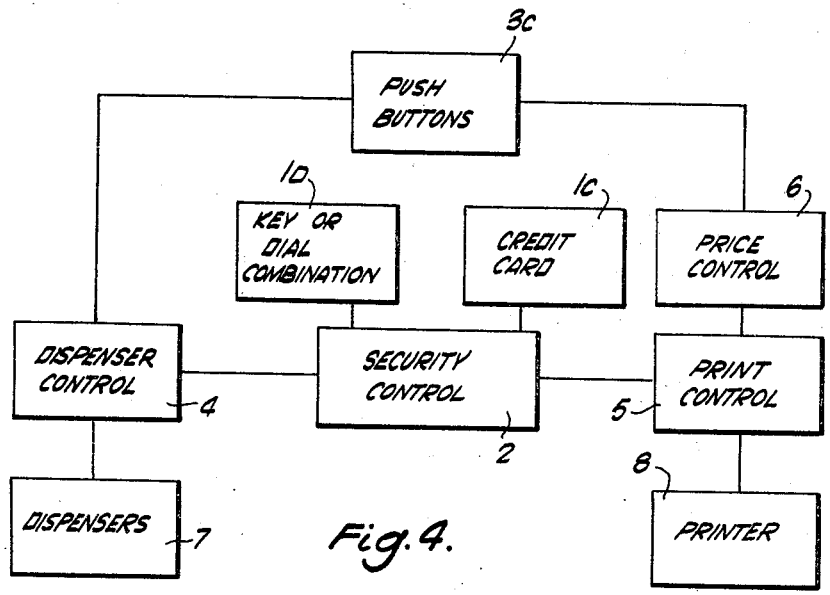
FIGURE 4 is a schematic block diagram illustrating another modification of the diagram of FIGURE 1.

FIGURE 4 illustrates a further modification of the system described with reference to FIGURE 1. In this case each customer is again provided with a credit card 1C bearing information representative of his identity. At the same time the customer is provided with an identifying key, or with a dial combination 1D carried in his memory. If a key is used, both the credit card and the key must be inserted into appropriate sensing devices in order to actuate the vending system. If a dial combination is used instead of a key, the customer is required to set manually a series of dials to a combination that correctly matches identification information on the credit card 1C. Selection of the desired merchandise may be registered using a push-button panel 3C. Otherwise the operation of the system shown in FIGURE 4 is the same as that of FIGURE 1.

It will be obvious to those skilled in the art that FIGURES 2-4 are not exhaustive of selector and identification devices that could be used in association with the present invention.

It is contemplated that the systems shown in FIGURES 1 through 4 operate so that if a customer presents an incorrect combination of credit card and key, credit card and dial combination, credit card and selector card, or punch card and dial combination, an appropriate alarm will be sounded and the card, key, etc., as the case may be, will be retained so that an attendant can determine the cause of the difficulty and, if an unwarranted person is using the identification card (or as the case may be), prevent further use of the card and return the same to its rightful owner. This operation is more fully described in the aforesaid patent application Ser. No. 533,682.

The dispensing apparatus

Referring now to FIG. 5, the only portion of the vending apparatus which will ordinarily be visible and accessible to purchasers will be that portion lying to the left of front wall 10 of the housing 11 for the apparatus. The merchandise for sale may be conveniently exhibited in a pair of display windows 13 separated by a centrally-disposed dispenser control housing 12, the lower portion of which terminates in a receiving station 14. At one side of the receiving station 14 a sliding door 17 (normally closed, shown partly open) covers an access port 18 through which the customer obtains access to goods delivered to the receiving station 14 by a conveyor 22. The sliding door 17 may preferably be automatically opened by any convenient known means at or near the beginning of the vending operation, and may preferably require closure by a purchaser following completion of the operation in order to actuate a switch permitting the purchaser's credit card (or the like) to be withdrawn. A latching device then preferably keeps the door 17 locked shut until the next-following purchase.

The horizontal surface 16 of the receiving station 14 serves as a counter. Immediately above the receiving station 14 and located in the dispenser control housing 12 are slots 15 and 21 into which a credit card 19 and a selector card 20 may be inserted to actuate the vending operation. A slot 27 is also provided from which an invoice 25 for the dispensed articles issues. This will be described in greater detail below, it being understood that the use of a credit card-selector card combination is exemplary only and that any other identification and selection combination described with reference to FIGURES 1-4 might be used instead.

On the right-hand side of the front wall 10 of the housing 11 is that portion of the vending apparatus accessible only to the operator of the vending apparatus. On either side of the conveyor 22 are a plurality of dispensing units. In FIGURE 5, only two types of dispensing units are shown by way of example, namely, a sliding-tray type dispensing unit 28 and a drawer-type dispensing unit 30. The sliding-tray type dispensing unit 28 is appropriate for relatively large items of merchandise such as canned goods and packaged cereals; while the drawer-type dispensing unit 30 is appropriate for relatively small articles such as cigarettes and razor blades.

The sliding-tray type dispenser 28 is housed in a frame 29 including an inside vertical end frame 33, and at its outermost end, an outer vertical end frame 32 and an inner vertical frame 34. The spacing between the two vertical frames 32 and 34 must be at least as great as the width of the largest article dispensed by the apparatus, as will be apparent from the discussion which follows.

Between the frames 32 and 34 is disposed a reciprocating frame 46 mounted for horizontal movement on rollers 49 bearing against L-frame members 31 at the top and bottom of the dispenser 28. The reciprocating frame 46 is pivotally connected to reciprocating linkage members 50 which are in turn pivotally connected to cranks 51 attached to a lower shaft 54 and an upper shaft 56 rotatably mounted in any convenient manner on the vertical frame 34. The shafts 54 and 56 may extend to adjacent dispenser units (shown in outline in broken lines) and may be connected to reciprocating frames or the like mounted similarly in the adjacent units.

An electric motor 48 provides power to the shaft 54 via a chain drive 52. Power is transmitted from the lower shaft 54 to the upper shaft 56 via a chain drive 55.

Between the end frames 33 and 34 there are, extending lengthwise in horizontal alignment to one another, a plurality of L-shaped frame members 36 in vertically-spaced relationship. Similar L-shaped members 38 extend horizontally and in similar vertically-spaced relationship to form part of the vertical frames 33 and 34. The vertical spacing of the members 36 and 38 is arranged to provide sub-divisions of varying depth in order to accommodate different sizes of articles of merchandise stored thereon.

Mounted on the L-shaped members 36 are a plurality of magazines 40 adjacent to one another in side to side relationship. Each magazine holds several items of merchandise, but there is only one kind and brand of merchandise in any magazine. The magazines 40 are removably affixed to the L-shaped members 36 and 38 at the inside and outside ends of the frame 33 (the inside end being that nearest to the conveyor 22). The removable mounting may be a downwardly extending tab 42 on the underside of the magazine 40 in engagement with a slot 44 in the associated L-shaped frame member 38 (shown in detail in FIGURES 6 and 7). Slots 44 are located at desired intervals along the L-members 38 so that the positions of the magazines may be altered.

As can be seen in FIGURE 6, each magazine 40 includes a channel portion 62 closed at its outermost end by a back plate 64 integral therewith. Extending outwardly from the upper edges of the side walls 66 of the channel portions 62 are horizontal flanges 68 having upstanding edges 70 integral therewith and forming guide walls for a tray 95 slideable on the flanges 68 and for the commodities stored in the magazine. It is contemplated that a number of different sizes of magazines 40 having varying distances between guide walls 70 may be provided to accommodate merchandise of different sizes. The distance between the flanges 70 need not, of course, correspond exactly to the breadth of the articles stored in the magazine. However, in some circumstances it may be desirable to have more than one size of magazine 40 to accommodate widely differing sizes of articles of merchandise stored in the magazines.

In each of the L-shaped members 38 in the vertical frame 34 are a plurality of regularly-spaced U-shaped notches 74. Associated with each magazine 40 and extending through the corresponding notch 74 is a push rod 72 the inner end of which is slideably supported in a hole 77 in a bracket 78 fixed to the channel portion 62, near the innermost end of the channel 62. The outer end of the push rod 72 is slideably supported in a hole 76 in the back plate 64. Attached to the projecting outer end of the push rod 72 is an outer bushing 101 lying to the outside of an associated cross bar 60 forming part of the reciprocating frame 46. Mounted on the push rod 72 between the reciprocating frame 46 and the frame 34 is an adjustable bushing 100 which may be fixed to the push rod 72 at any position intermediate the vertical frame 34 and the rest position of the reciprocating frame 46 (adjacent the end frame 32).

Along that part of the push rod 72 projecting outwards beyond the notch 74 is a graduated scale 73 which may be marked in, for example, inches and fractions of an inch. The zero point of the scale (not shown) is immediately in line with the innermost limit of travel of the reciprocating frame 46, i.e., adjacent the L-member 38. The bushing 100 is then positioned so that the distance X between the outer edge of the bushing 100 and the innermost limit of travel of the reciprocating frame 46 adjacent the frame 34 is equal to the width X of a single article of merchandise carried by the magazine 40. This results in the dispensing during the vending operation of only one item of merchandise from the magazine 40, as will be described in greater detail below. If desired, the bushing 100 may be set at a distance which is some multiple of the width X of the articles 94 stored in the magazine 40 so that a predetermined number of articles are dispensed upon any one dispensing operation instead of one only.

The tray 95 slideable in the magazine 40 comprises an upright plate 96 and a horizontal plate 97 integral therewith. An upright plate 96 fixed to the tray 95 bears against the merchandise supported by the magazine 40. The merchandise is closely stacked inwardly from the upright plate 96 to the end frame 33. In FIGURE 6, a single packaged article 94 is shown as representative of the commodity nearest the plate 96.

The push rod 72 is engaged intermediate the bracket 78 and the back plate 64 by a non-return slide arrangement 80. The tray 95 is attached to a bracket 82 and a spring 84 also attached to bracket 82 provides friction as it moves along pushrod 72. A bar 86 has a hole (not shown) in its lower end 92 slightly larger than the push rod 72. The bar 86 fits in a hole 90 in the bracket 82. Binding between the bar 86 and the push rod 72 provides one way motion. The weight of the bar 86, outwardly flared at portions 89 and 85, causes the binding only during the inward-motion of the push rod 72 and there is no binding when the push rod 72 is moved in the opposite direction. This principle is not new and is used on clamps, jacks, etc. When the tray 95 has reached its innermost position, the operator may draw the bar 86 outwards, overcoming the frictional forces exerted by the spring 84, and the magazine may be restocked with goods.

Associated with each push rod 72 and mounted on the associated cross bar 60 of the reciprocating frame 46 is a solenoid 58. A finger 98 pivotally mounted on the housing of the solenoid 58 moves from an approximately horizontal position to a downwardly-projecting position when the slenoid is actuated by current flow therethrough.

In its downwardly projecting position, the finger 98 makes contact with the bushing 100 when the reciprocating frame 46 moves inwardly.

The operation of the sliding-tray type of dispenser is as follows. Referring to FIGURE 5, when a purchaser makes a selection by inserting the selector card 20 (say) into the slot 15, means are actuated, to be described in detail below, which inter alia supply power to the motor 48. The shafts 54 and 56 turn through a complete revolution, thereby reciprocating the frame 46, which during the first half-revolution moves from its rest position adjacent the outer frame 32 in a substantially horizontal direction until, at the inner limit of its travel, the frame 46 almost touches the vertical frame 34. In the next half-revolution of the shafts 54 and 56, the reciprocating frame 46 returns from its innermost position adjacent the frame 34 to its rest position adjacent the frame 32.

In respect of each magazine 40 bearing merchandise that has not been selected by the customer, the associated solenoid 58 is not actuated and therefore the finger 98 does not make contact with the bushing 100. Accordingly, no inward movement is transferred from the reciprocating frame 46 to the push rod 72.

However, in respect of each magazine carrying merchandise selected by the purchaser, the corresponding solenoid 58 is actuated, causing the finger 98 to move downwardly so as to engage the bushing 100. Because of the binding action of the nonreturn arrangement 80 comprising the bar 86 and the nonreturn spring 84, the inner movement of the push rod 72 is transferred to the tray 95 via the bar 86 bearing against the U-shaped bracket 82 to which tray 95 is attached. This motion is in turn transferred via the plate 96 to the line of articles 94. The innermost article is therefore pushed over the innermost edge of the magazine 40 and drops onto the conveyor 22.

As discussed above, the bushing 100 is set so that the distance X between it and the cross bar 38 of the frame 34 is equal to the width X of each article 94 carried by the magazine 40. While the reciprocating frame 46 moves from the bushing 101 to the bushing 100 through a distance W, no motion is transferred to the push rod 72. However, as soon as the finger 98 makes contact with the bushing 100, motion is transferred to the push rod 72 and thence to the line of articles 94. For articles of maximum width, "X" will be a maximum and the bushing 100 will be positioned near the rest position of the reciprocating frame 46. For articles of smaller width, the bushing 100 may be positioned nearer the frame 34 as required.

On its return movement, the cross bar 60 of the moving frame 46 strikes the bushing 101 and moves the push rod 72 back to its rest position. During the return movement of the reciprocating frame 46, there is no binding of the bar 86 against the push rod 72 and therefore the tray 95, held by friction against the flanges 68 by spring 84, remains stationary.

As an extra precaution, to prevent more than one article 94 from being dispensed during any one operation, the innermost edges of the horizontal side portion 68 of the magazine 40 may be provided with embossed lips 102, (see FIGURE 7), which act as a small barrier to articles next to the one being dispensed, but do not interfere significantly with the inward movement of the article being dispensed.

Attached to the bracket 78 is an upturned lip 104 which, when the tray 95 reaches its innermost position, disengages the bar 86 and prevents the push rod 72 from pushing the tray 95 any further inwards. Also, an empty switch 106 is provided having an actuating member 105 projecting into the channel portion 62 through an opening 107 in the base of the bracket 78. When the tray 95 reaches its innermost position, the innermost end 88 of the U-shaped bracket 82 pushes the actuating member 105 inwards, thereby registering, in a manner to be described in detail below, that the magazine is empty and, in some instances, transferring the dispenser-actuating current to another solenoid 58 associated with another magazine containing the same merchandise.

If the uppermost magazine 40 in any dispenser 28 is several feet above the conveyor 22, articles dispensed from the upper magazines will have a substantial fall when dropping down to the conveyor 22. In order to break the fall and thereby minimize the risk of damage to articles falling from the uppermost compartments, a pivoting panel 110 may be provided (see FIGURE 8) which is pivotally connected to a bracket 111 fixed to the end frame 33 of the dispenser 28. A rod 112 is pivotally connected to the reciprocating frame 46 by a pin 109, and is similarly pivotally connected to the panel 110 by means of a pin 113. When the reciprocating frame 46 is in its rest position adjacent the end frame 32, the rod 112 is in its outermost position and therefore the panel 110 will rest in a vertical plane against the end 33 of the dispenser 28. However, when the frame 46 is reciprocated, the rod 112 will push the panel 110 outwards, forcing it to assume the inclined position shown in broken lines in FIGURE 8. Thus, any articles dispensed from the uppermost magazines of the dispenser 28 will fall onto the panel 110 and will slide down this panel and drop over the lower edge onto a slide 114 mounted beneath the drawer-type dispenser 30 opposite, from where they will gradually slide onto the conveyor 22.

Quite clearly it is preferable to store packages most likely to be damaged in the lower one or two rows of magazines in the dispenser 28. Articles not easily damaged can be placed on the top rows of the dispenser 28 or on those rows just underneath the bracket 111.

The vertical drawer-type dispenser unit 30 shown in FIGURES 5, 8, 9 and 10 is used for dispensing relatively small-sized articles. Each unit 30 comprises an upper housing 116 supported by a suitable frame structure 118. The housing 116 houses a plurality of drawers 120 which are adapted in any known convenient manner to slide into and out of the housing 116. FIGURE 8 illustrates one such drawer partially pulled out. Between adjacent drawers 120 is a spacing member 122 (see FIGURE 9) of sufficient width to provide a space between adjacent drawers thereby to permit articles to drop out of those drawers carrying merchandise selected by a consumer.

Figure 9:
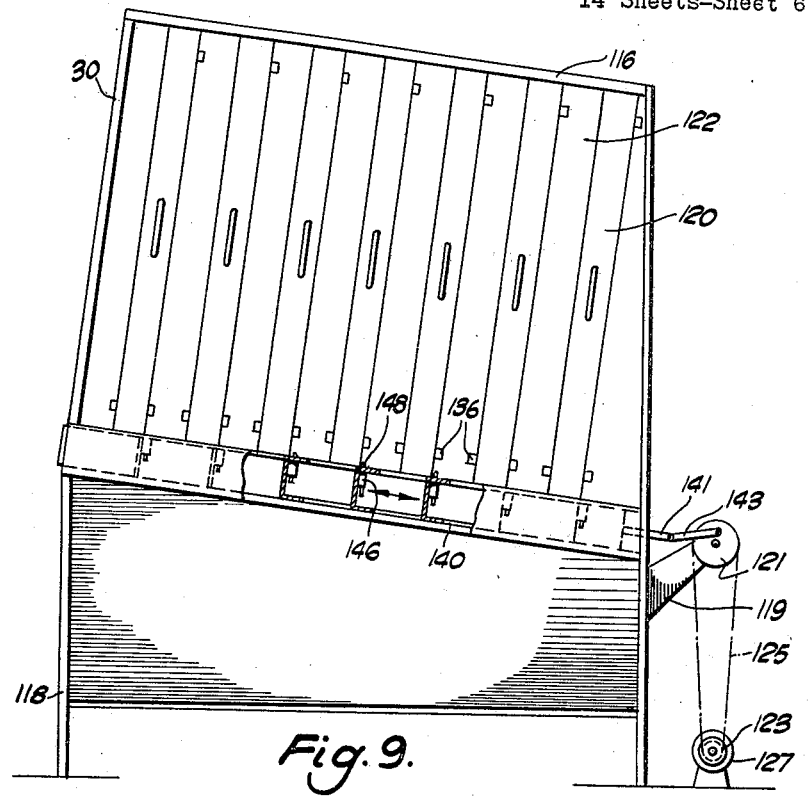
FIGURE 9 is an elevation view of the other of the two types of dispensing apparatus shown in FIGURE 5.
Figure 10:
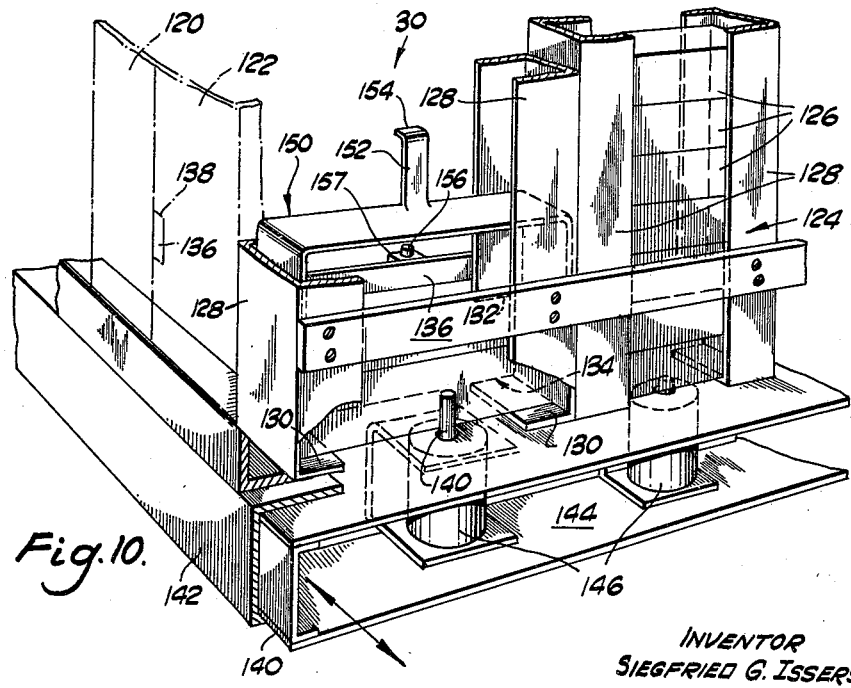
FIGURE 10 is a detailed perspective view of the operational components associated with the dispensing unit illustrated in FIGURE 9.

Beneath the drawers 120 and fixed to the housing 116 are U-shaped brackets 142 in which a reciprocating frame 140 is slideably mounted (see FIGURE 9 and FIGURE 10). Fixed to one end of the moving frame 140 is a projecting element 141 to which one end of a reciprocating link member 143 is pivotally attached. The other end of the number 143 is pivotally attached to the periphery of a rotatably-mounted pulley 121 driven via a drive belt 125 by a pulley 123 driven by an electric motor 127.

Each drawer 120 is subdivided into a series of vertical compartments 124 formed by oppositely-facing U-brackets 128 (see FIGURE 10). Each compartment 24 houses a plurality of identical items of merchandise, and the spacing of the U-brackets 128 is chosen to accommodate the particular merchandise stored in the respective compartment. The brackets 128 are bolted or riveted to horizontal bars 136 which may also serve as guide members upon which the drawers 120 may be slideably mounted.

At the bottom of each U-bracket 128 is a horizontal flange 130 which projects inwardly into the compartment 124 and serves as a support for the commodities stored in the channel. The lower portion of each U-bracket 128 facing the space provided by the associated spacing member 122 is recessed at 132 to form an opening 134 which is wide enough to permit the ejection of only one article at a time from the associated compartment 124.

Fixed to cross pieces 144 of the reciprocating frame 140 are a plurality of solenoids 146, one solenoid 146 being provided for each compartment of each drawer. In the rest position of the reciprocating frame 140, each solenoid 146 is positioned just to the right (as seen in FIGURE 9) of the compartment with which it is associated, and more or less midway between the oppositely-facing U-brackets 128 forming the compartment. Each solenoid 146 is provided with a pin 148 which, when current flows through the solenoid 146, projects upwardly above the level of the flange 130. In its rest position, the pin remains below the level of the flange 130.

Slideable in the U-brackets 128 is a moving bracket 150 which acts as a weight forcing the articles of merchandise 126 located in the compartment 124 to move downwardly and to abut against the flanges 130. Each moving bracket 150 is provided with an upwardly-extending finger 152 provided at the top with an outwardly projecting flange 154. In the lowermost position of the moving bracket 150, the projecting flange 154 makes contact with the actuating pin 156 of an empty switch 157. When the flange 154 strikes the actuating pin 156, the empty switch 157 signals, as will be described in detail below, that the associated channel 124 is empty and may transfer the solenoid-actuating current to another solenoid associated with a channel bearing the same merchandise.

The supporting structure 118 is provided with a slide 114 which slopes downwardly towards the conveyor 22. The slide 114 serves to break the fall of articles dropping out of the drawers 120 and permits these articles to slide gradually onto the conveyor 22. It is obvious from a study of FIGURE 8 that it is preferable to store relatively easily-damaged articles in the rear portion of the drawers nearest the top of the slide, whereas articles that cannot be damaged easily may be stored at the front of the cabinets and permitted to fall through a greater distance to the slide 114. As mentioned above, the slide 114 also co-operates with the pivoting panel 110 to break the fall of articles dispensed from the opposite sliding tray-type dispenser unit 28.

As can be seen in FIGURE 9, the housing 116 may be inclined to facilitate filling of the drawers.

The operation of the drawer-type dispenser 30 can be readily inferred from the foregoing description but will be described in more detail as follows:

When the purchaser starts the vending operation by inserting his credit card and selector card (or in some other manner), the motor 127 operates to rotate the pulley 121 through a complete revolution. The rotary motion of the pulley 121 is translated into reciprocating motion by the linkage element 143 and the extending member 141 attached to the frame 140. The frame 140 therefore moves to the left (as seen in FIGURE 9) and then moves back to its rest position.

For each compartment containing merchandise selected by the purchaser, the associated solenoid 146 is actuated and the pin 148 projects upwardly. Thus, when the reciprocating frame 140 moves to the left, the upwardly-projecting pin 148 engages the lowermost article 126 in the associated compartment 124 and causes it to move outwards through the gap 134 into the space between adjacent drawers, from where the article drops onto the slide 114 and thence to the conveyor 22. Following dispensing of an article from any given compartment, the remaining articles fall downwardly under the weight of the bracket 150 and the lowermost article comes to rest against the flanges 130 of the brackets 128.

For each compartment containing merchandise not selected by the consumer, the pin 148 in the associated solenoid 146 remains retracted and therefore the reciprocating motion of the frame 140 does not affect merchandise in the nonselected compartments.

In order that the projecting pin 148 does not interfere with the lowermost package upon the return movement of the reciprocating frame 140, it is necessary that current should not flow through the solenoids 148 during the return cycle of the moving frame 140. The means of accomplishing this will be discussed below.

Figure 11:
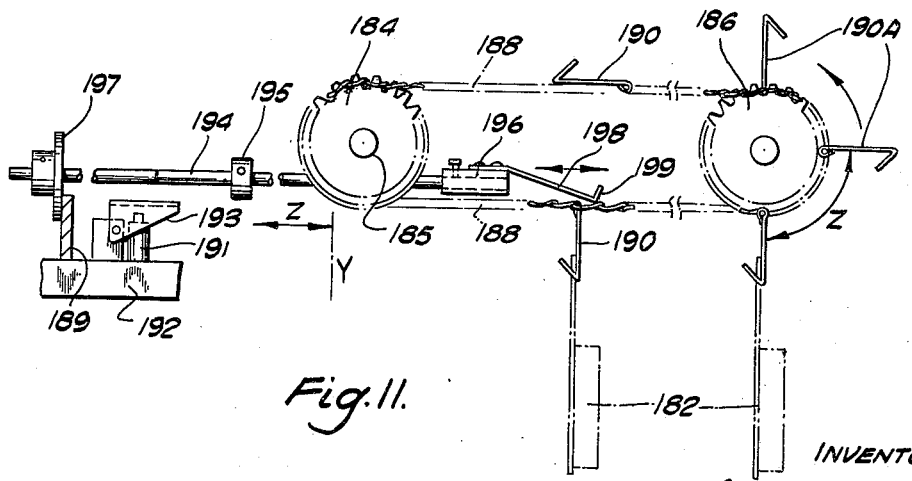
FIGURE 11 is a side view of a further embodiment of dispensing apparatus constructed in accordance with the invention.

FIGURE 11 illustrates a further type of dispenser for use with articles that can be easily suspended on hooks, such as bags of potato chips. This dispenser, generally indicated as 180, includes a pair of wheels 184 freely rotatably mounted on axis 185 supported by a frame (not shown). The wheels 184 and 186 are provided with teeth engaging the links of an endless chain 188 the lower run of which serves as a conveyor for the packaged articles. Spaced along the chain 188 are hooks 190 for carrying packages 182 adapted to be suspended on the hooks 190. In FIGURE 11 only two such packages 182 are shown, but it is of course understood that the distance between the two wheels 184 and 186 is relatively long and in most cases a dozen or more articles would be suspended on the lower run of the chain 188.

Parallel to the line joining the centres of the two wheels 184 and 186 is a push rod 194 provided with an end bushing 197, an adjustable bushing 195, and an end connector 196. Fixed to the connector 196 is a tongue 198 having an angled portion 199 at its right-hand end as seen in FIGURE 11. The shape of the tongue 198 is such that left-to-right motion of the tongue results in the engagement of the angled portion 199 with the adjacent link of the chain 188, whereupon the left-to-right motion of the tongue is transferred to the chain. However, on right-to-left motion of the tongue 198, the inclined shaft of the tongue simply glides over the links of the chain and the chain does not move from right to left.

A reciprocating frame 192, analogous to the reciprocating frame 46 referred to with reference to FIGURE 5, is attached to reciprocating means (not shown) which causes the reciprocating frame 192 to move during the dispensing operation, to the right from its rest position at the left, and then to return to its rest position. Fixed to the reciprocating frame 192 is a solenoid 191 to which is pivotally attached a finger 193 actuated by the armature of the solenoid 191. When current flows through the solenoid 191, the finger 193 is elevated to a position in which it can make contact with the bushing 195, on the left-to-right motion of the frame 192. If no current flows through the solenoid 191, the tongue 193 remains depressed and will not make contact with the bushing 195 on the left-to-right motion of the reciprocating frame 192. The frame 192 is further provided with an upright element 189 adapted to make contact, on its right-to-left motion, with the bushing 197 fixed to the push rod 194. The element 189 is proportioned so that it does not contact the bushing 195.

If the right-hand limit of movement of the elevated finger 193 is defined by the vertical broken line Y, the bushing 195 is positioned so that its left-hand edge is at a distance Z from the limit line Y, where Z represents the distance along the chain 188 between adjacent hooks 190. If, however, it is desired to dispense more than one article 182 in a single vending operation, the bushing 195 may be positioned further to the left. For example, if it is desired to dispense two articles 182 in a single vending operation, the bushing 195 should be positioned so that its left-hand edge is in line with a marker point 191 which is a distance 2Z from the limit line Y.

The operation of the dispensing apparatus shown in FIGURE 11 is readily inferred from the foregoing description, but will be elaborated as follows:

When the purchaser starts the vending operation by inserting his credit card and selector card (or as the case may be), means (not shown) analogus to those described with respect to dispensers 28 and 30 are actuated to reciprocate the moving frame 192 from its left-hand rest position towards the right and back again. For each chain-suspended article selected by the purchaser, the corresponding solenoid 191 is actuated and the finger 193 elevated. The initial portion of the left-to-right motion of the finger 193 is lost motion but during the latter part of the first half-cycle of the dispensing operation, the finger 193 strikes the bushing 195 and pushes the connector 196 fixed to the end of the rod 194 through a distance Z to the right. The angled portion 199 of the tongue 198 engages a link of the chain 188, forcing the lower run of the chain through a distance Z to the right. Because the bushing 195 is fixed a distance Z from the limit line Y defining the right-hand limit of travel of the finger 193, the hook 190 positioned directly beneath the centre of the wheel 186 will be forced to move around the wheel 186 to a position 190A at which point the slope of the hook is such that the article 182 suspended thereon will drop off. The distance Z is, of course, preselected so that this result is attained. The drop off position of the article is arranged to be immediately above the conveyor 22 or above a slide (not shown) leading to the conveyor. At the same time, the next-following article 182 is moved from a position to the left of the wheel 186 along the lower run of the chain 188 to a position directly beneath the centre of the wheel 186, from where it can be dispensed in the next following vending operation.

For those chain-suspended articles that are not selected by the purchaser, the corresponding finger 193 is not elevated and therefore on the left-to-right motion of the frame 192, the tongue 193 passes freely beneath the bushing 195 and no motion is imparted to the chain 188.

On the return right-to-left motion of the reciprocating frame 192, the tongue 198 glides freely over the chain 188, which remains stationary. The upright element 189 fixed to the moving frame 192 makes contact with the bushing 197 fixed to the push rod 194, thereby forcing the push rod 194 back to its rest position.

It will be understood that a series of aligned chain dispensers 180 may be provided, to be actuated by a single reciprocating frame 192.

Figure 12:
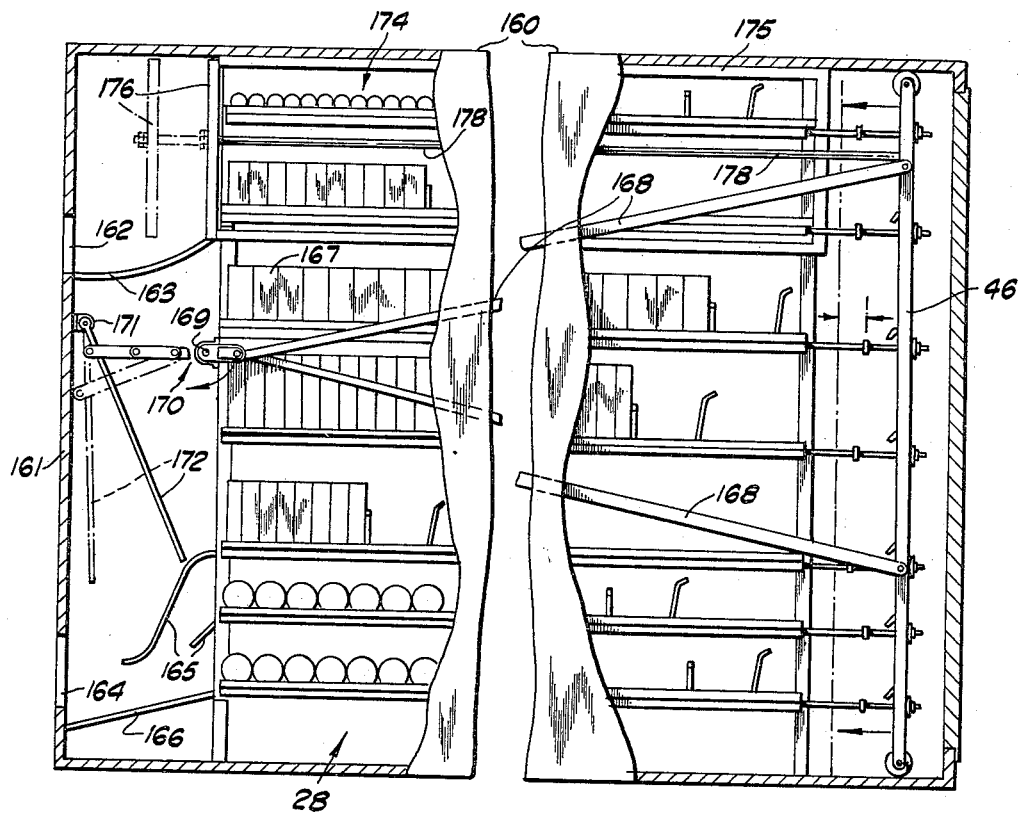
FIGURE 12 is a side view of a modification of one of the dispensing units illustrated in FIGURE 5.

In some situations, it may not be necessary to provide a plurality of dispensing units; the number of different products to be dispensed may be small enough that all can be accommodated within a single housing. In such a case, there is no need for a conveyor and the overall structure of the vending apparatus may be simplified. Such a vending unit 160 is shown in FIGURE 12. This unit 160 includes a framework substantially the same as that of the vending unit 28 shown in FIGURE 5, and is provided with a plurality of sliding-tray-type magazines, although it could be provided, if desired, with drawer-type dispensers or chain-type dispensers as well.

A reciprocating frame 46 is provided which operates in substantially the same manner as the reciprocating frame 46 shown in FIGURE 5. In the apparatus of FIGURE 12, however, a crank 167 is rotated by a shaft 169, and the rotary motion of the crank 167 is transferred into reciprocal movement of the frame 46 via arms 168 pivotally connected at the left-hand end (as seen in FIGURE 12) to the crank 167 pivotally connected at the right-hand end to the frame 46.

The main difference between the unit shown in FIGURE 12 and the unit 28 is in the manner of discharging the selected items once they fall from the magazine.

In the left-hand end of the housing for the vending apparatus shown in FIGURE 12, an access port 164 is provided through which the purchaser may obtain access to articles dispensed onto a slide 166 leading to the access port 164. Small slides 165 may be used to break the fall of articles dispensed from higher magazines, and are shaped so as to provide a barrier, between the access port 164 and the lowermost magazines. This serves to prevent people from reaching in through the port 164 to obtain articles from the lower magazines. For the upper magazines, a pivoting panel 172 functions both as a slide and as a barrier to prevent consumer access. The panel 172 is pivotally connected to a bracket 171 fixed to the left-hand wall of the housing of the vending machine and is further pivotally connected to reciprocating linkage 170 which may be attached to the arms 168 or to the crank 167. (The attachment is not shown in FIGURE 12.) The linkage is designed so that in the rest position of the moving frame 46, the panel 172 is in its inclined position to the right of the left-hand wall 61, thereby preventing access by a consumer through the entry port 164 to the upper magazines. Upon reciprocation, the panel 172 moves from its extended position to a vertical position shown in broken lines adjacent the wall 161. This permits articles to drop freely from the upper magazines onto the uppermost slide 165 and thence to the slide 166.

FIGURE 12 also illustrates a frozen food compartment which is mounted at the top part of the dispenser 160. Such a frozen food compartment, generally indicated as 174, could of course be used in conjunction with the sliding-tray type dispenser 28 as well. The compartment 174 is surrounded by insulating walls 175 limiting the amount of heat transferred to the compartment. An insulating door 176 provides a tight closure for the left-hand end of the refrigerated compartment when the reciprocating frame 46 is in its rest position. A push rod 178 connects the reciprocating frame 46 to the door 176. A slide 163 connected between the left-hand bottom edge of the frozen food compartment 174 and the wall 161 leads to an access port 162 giving the purchaser access to items dispensed from the frozen food compartment. It will be readily perceived that when the frame 46 reciprocates, the door 176 is pushed open by the push rod 178 thereby permitting the dispensing of any articles stored in the magazines in the frozen food compartment 174. The manner of dispensing selected articles of frozen food, using solenoids operable by the purchasers, is completely analogous to the methods already described.

Dispenser control

Figure 13:
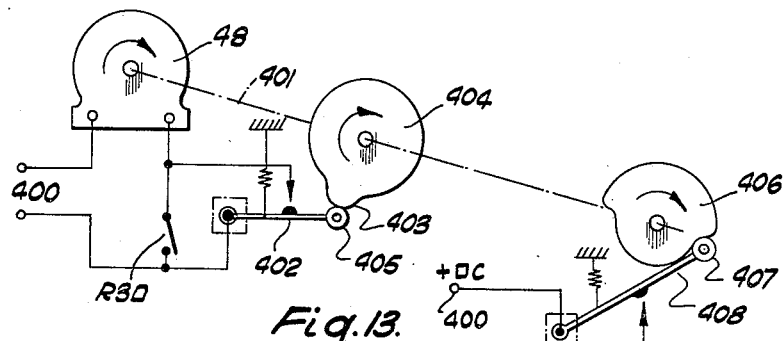
FIGURE 13 is a schematic diagram illustrating the electric circuit used to control the dispensing operation.

FIGURE 13 illustrates the circuitry used to control the dispensing operation. The dispensing motor 48 (see FIGURE 5) is shown as representative of the motors that are used to actuate the dispensing movement. It will be understood that all other such motors could be connected in a manner similar to the connection of motor 48 shown in FIGURE 17. The input current applied across terminals 400 flows through the motor 48 when either switch R3D or switch 402, connected in parallel, is closed. The switch R3D is closed by the relay L3 illustrated in FIGURE 18. The closing of the switch R3D causes the shaft 401 driven by the motor 48 to revolve, causing a cam 403 on a cam wheel 404 connected to the shaft 401 to revolve away from an associated cam follower 405, which controls a switch 402, thus permitting the switch 402 to close. Thus, current is supplied to the motor 48 through the switch 402 for a complete revolution of the shaft 401, even though the switch R3D may open in the interim. The circuit is broken to the motor 48 as soon as the cam 403 returns to its starting position forcing the cam follower 405 outwards thereby to open the switch 402.

Also connected to the shaft 401 is a cam wheel 406 bearing a 180° cam. The cam wheel 406 actuates a cam follower 407 which controls a switch 408. The switch 408 is normally open but closes, following the outward motion of the cam follower 407, just after the shaft 401 begins to turn. The switch 408 remains closed for the first half-revolution of the shaft 401. While the switch 408 is closed, current flows from a DC source 410 through the switch 408 and thence through any of an array of parallel-connected solenoids LS1, LS2, etc., for which the corresponding series-connected selector switch SS1, SS2, etc., is closed. The solenoids LS1, etc. correspond to solenoids 58 shown in FIGURE 6, or the like.

When the purchaser makes his selection of commodities, he closes, through one of several possible means, a plurality of switches corresponding to the commodites desired to be purchased. One throw of these switches is shown as switches SS1, SS2, etc. in FIGURE 13. The closing of any given selector switch SS1, etc., results in flow of current through solenoids LS1, etc. (depending upon which selector switches are closed). Actuation of each solenoid corresponding to the purchaser's selection results, as has been described previously, in the impartation of the dispensing motion to the corresponding selected commodity. As has also been described above, failure to actuate a solenoid corresponding to a given commodity results in the reciprocation of the frame 46 (or the like) without affecting the non-selected commodities.

It will further be recalled that in the case of some solenoids, such as solenoids 157 shown in FIGURE 10, it is undesirable for the solenoid to be actuated during the return half-cycle of the reciprocating dispensing movement. For that reason, the cam wheel 406 bears a 180° cam so that cam follower 407 permits switch 408 to open after the first half-revolution of the shaft 401, interrupting current flow to the solenoids.

Figure 14:
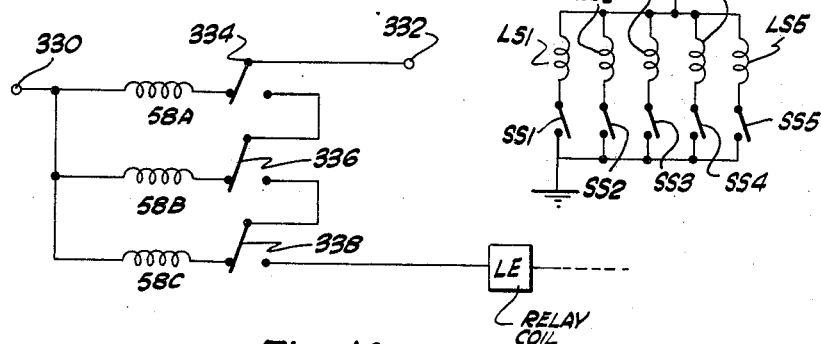
FIGURE 14 is a schematic diagram illustrating the operation of empty switches operative when a storage unit becomes empty.

FIGURE 14 shows the circuitry employed for solenoids associated with separate storage units containing identical merchandise and actuated by a single selection device (e.g., by a single push-button). By way of example, suppose that there are three magazines containing a particular brand of breakfast cereal. Each of these magazines has associated with it a solenoid 58 (see discussion relating to FIGURE 5 ff.) which, when actuated, causes the dispensing of one package of cereal (say) when the reciprocating frame 48 or the like reciprocates. In FIGURE 14, a solenoid 58A is associated with the first magazine containing the breakfast cereal, a solenoid 58B with the second magazine and a solenoid 58C with the third magazine. Normally, the three magazines will be full and the three associated empty switches 334, 336, 338 will be in the positions shown in FIGURE 14. Empty switches 334, 336, 338 correspond to the empty switch 106 of FIGURE 7, e.g.). Current for the solenoids is supplied via terminals 330 and 332, and current flows when an appropriate selector switch (not shown in FIGURE 14, but see switches SS1, etc., in FIGURE 13) is actuated by the purchaser thereby registering selection of the particular breakfast cereal to which the circuit of FIGURE 14 relates. With the switch 334 in the position shown in FIGURE 14, the solenoid 58A is actuated when the purchaser selects the breakfast cereal; solenoids 58B and 58C do not pass current. However, when the magazine associated with the solenoid 58A becomes empty, the empty switch 334 is moved to the right. Thus the circuit to solenoid 58A is broken and a circuit is made via empty switch 336 through the solenoid 58B. This magazine then dispenses the same breakfast cereal until it too is emptied whereupon the empty switch 336 transfers the current to solenoid 58C via empty switch 338. Finally, when the last magazine is empty, the empty switch 338 moves to the right energizing relay coil LE. Contacts on the relay coil LE then actuate the "printred" control unit Q-4 and, "non-add" control unit Q-3, and prevent the price of the article from being printed. This will be further described below with reference to FIGURE 17.

Figure 15:
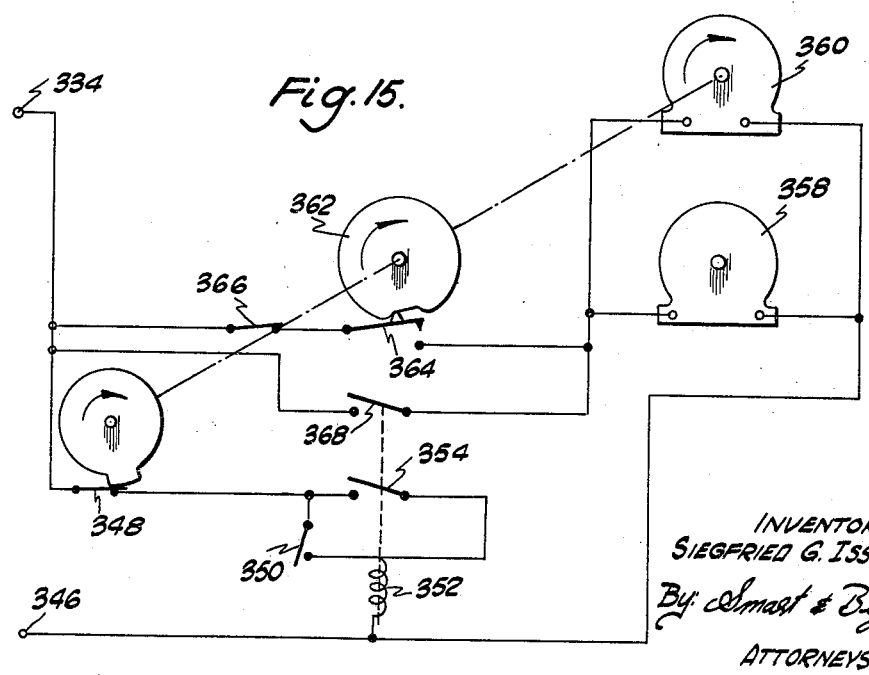
FIGURE 15 is a schematic diagram illustrating the electric circuit used to control the operation of the conveyor used for transporting the dispensed goods to a receiving station.

FIGURE 15 illustrates the circuitry used for controlling the conveyor belt 22 that conveys dispensed articles from the dispensers to the receiving station 14. A conveyor belt motor 358 drives the conveyor 22 and the length of time that the motor 358 runs is governed by a timer motor 360 which is designed to make one complete revolution in a length of time determined by the maximum time required for articles dispensed from the magazines furthest from the receiving station 14 to reach the receiving station. Thus, if the articles furthest from the receiving station 14 take 6 seconds (say) to travel from the dispenser housing the articles to the receiving station, the conveyor motor 358 should operate for 6 seconds (or a few seconds longer in order to guard against accidental delays). Thus, the timer motor 360 would be selected to rotate once in (say), a 6-second interval. Alternatively, a system of gears could be used so that an output shaft driven by the timer motor and making a complete revolution in about 7 seconds (say) is provided.

Power for both the timer motor 360 and the conveyor drive motor 358 is provided via terminals 344 and 346. When the security control means closes the circuitry actuating the dispensing solenoids, dispenser motor and invoice printer, (e.g., by closing switch 62 of FIGURE 1 of applicant's patent application Ser. No. 533,682), it also closes a switch 350 which completes a circuit from terminal 344 to a switch 348 and thence through a relay coil 352 through the two motors to terminal 346. As soon as current flows through coil 352, contacts 354 and 368 close thereby ensuring that a complete circuit to motors 358 and 360 is made as long as the switch 348 remains closed.

The switch 348 is operated by a cam wheel 356 attached to the output shaft of the timer motor 360. The cam wheel 356 maintains the switch 348 closed during the first 30° of rotation of the cam wheel. Thus the timer motor 360 and the conveyor belt drive motor 358 remain operative notwithstanding the opening of switch 350 (which is preferably designed to open after a short delay, so that there is no danger of accidental continuous operation of the motors).

An alternative drive circuit for the two motors is provided through end switch 366 and cam-operated switch 364. The switch 364 is controlled by a cam wheel 362 attached to the output shaft of the timer motor 360. The cam-operated switch 364 is normally open but is closed after the cam wheel 362 revolves through 20 degrees. This cam wheel thus keeps the switch 364 closed until the timer motor 360 has completed or almost completed its full revolution, at which time the cam wheel 362 opens the switch 364 cutting off current to the two motors. After the shaft of the timer motor 360 has moved through 30°, relay 352 drops out but the motors remain running because switches 364 and 366 are closed.

The end switch 366 is provided at the receiving station 14 so that any articles carried by the conveyor belt 22 to the end wall of the station 14 bump into an actuator (not shown) for the end switch 366 thereby opening it. This interrupts flow of current to the two motors and prevents dispensed articles from creating a jam at the receiving station. As soon as the purchaser removes the articles via the port 18 (FIGURE 5), the end switch 366 moves to its normally-closed position again causing the two motors 358 and 360 to resume their operation and to transport any remaining articles to the receiving station 14.

After all articles have been dispensed and removed by the purchaser, the timer motor 360 completes its revolution, at which time the cam wheel 362 causes switch 364 to open thereby ending the motor cycle. It will be noted that at the same time the cam wheel 356 causes the switch 348 to close, but because the switch 350 has opened by this time, there is no complete circuit through the two motors. The conveyor belt drive cycle is thus complete and will not repeat until such time as another purchaser starts a further vending operation.

Printer and invoice control

Figure 16:
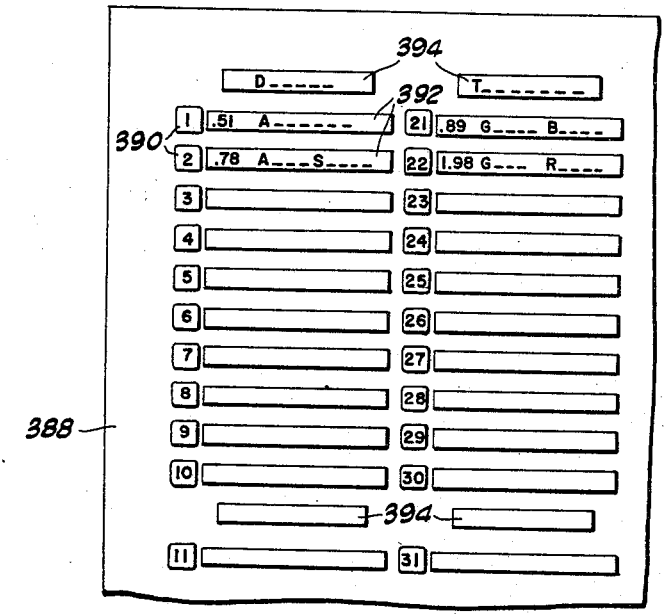
FIGURE 16 illustrates a sample invoice printed by the vending apparatus.

The operation of the invoice control means and the printer may be better understood by first referring to an exemplary invoice dispensed to a purchaser following completion of a purchase. Such an invoice is shown in FIGURE 16. (It is understood that any other form of invoice could be used instead.) The invoice is printed on a roll of paper similar to that used in ordinary adding machines. A ten-column figure capacity suffices for some installations, including the following exemplary model. Under the direction of the invoice control means, the printer prints a vertical series of horizontal rows or lines of figures. In FIGURE 16 the first (uppermost) line of figures utilizes the three columns at the extreme left and the three columns at the right. The figures at the far left of the first line are used to identify the station or any other numerically coded information (such as the date of purchase) that the operator of the vending machine may wish to register. The three right-hand figures in the first line represent the number of the particular purchase made during the day, week or other intervals. Thus, the invoice shown in FIGURE 16 represents the 167th purchase during some particular day or week, etc., as the case may be.

The second row of figures represents the identification number of the purchaser and is printed in cooperation with the security control means.

In order to separate the above-mentioned preliminary information from the information relating to the commodities purchased, a minus sign is printed in the third row. It is without significance so far as the addition of the bill is concerned.

Beginning with the fourth row, the items purchased by the customer are printed. The three left-hand columns represent the merchandise code number corresponding to the commodity purchased. Spaced by an empty column from the right-hand merchandise code number is a figure representing the number of articles purchased. Thus, referring to the invoice of FIGURE 16, there were two items purchased having code No. 9 and five items purchased corresponding to code No. 100.

The right-hand columns of figures represent the price of the selected commodity. The style of invoice shown in FIGURE 16 is premised on the assumption that no commodities will be sold having a value greater than $10.00. However, the system can easily be adapted to include items having higher values; all that is necessary is that the column capacity be expanded to handle the required number of figures.

In order to emphasize to the customer the difference between the preliminary information and the information relating to purchased merchandise, the preliminary information may be printed in red and the remaining information printed in black. Further, if it should happen that an item selected by the consumer is out of stock, it is preferable to print this item in red and of course it is necessary that the price of this item not be added to the prices of the items actually dispensed.

Any convenient means (not shown) may be provided permitting the purchaser to detach the invoice from the roll of paper following printing thereof. A duplicate of the invoice may be retained inside the vending machine.

Figure 17:
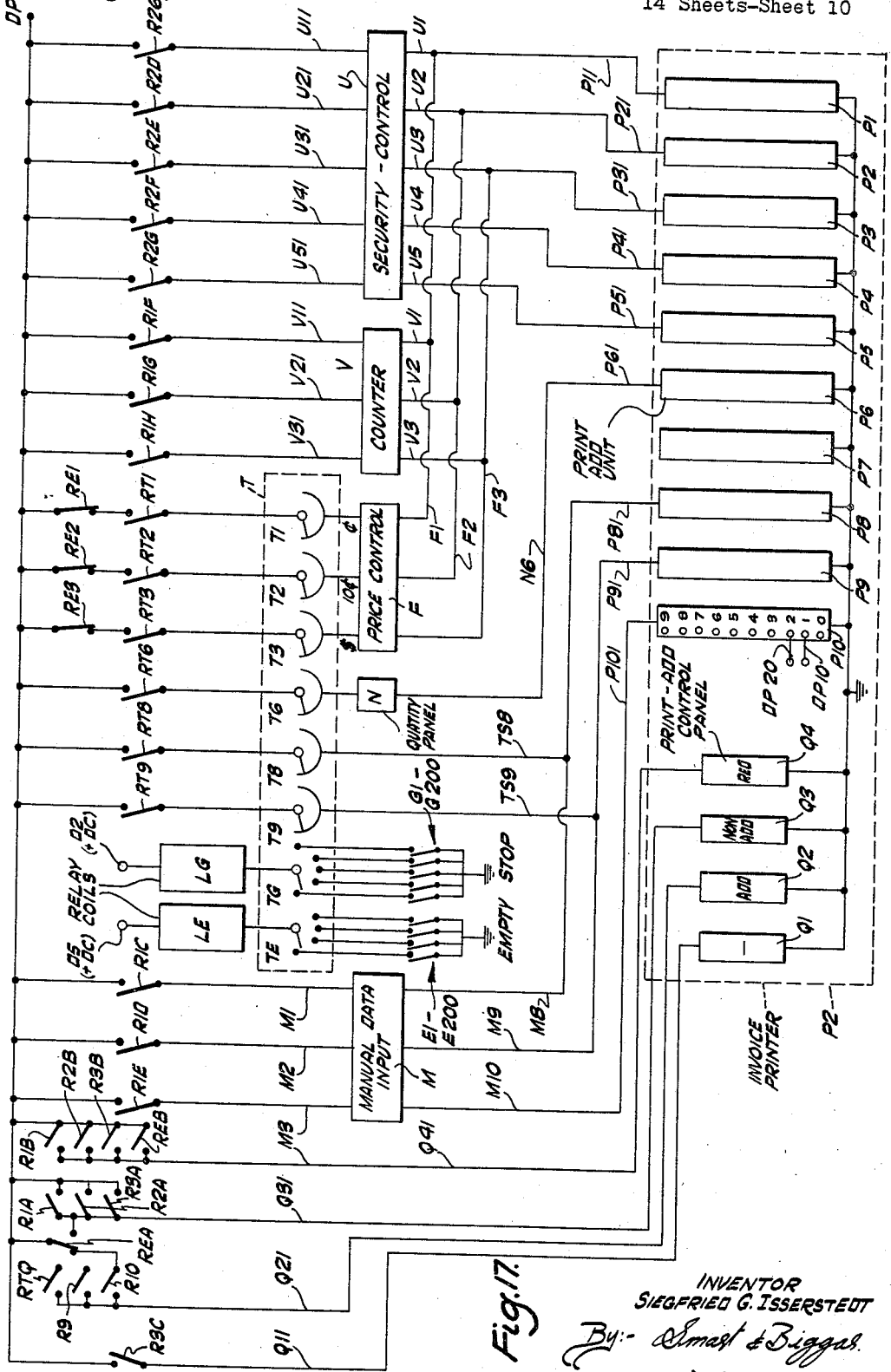
FIGURES 17 and 18 are schematic diagrams illustrating the electric circuits controlling the sequence of operations of the vending apparatus.

The invoice control means and printer are shown in schematic form in FIGURE 17. The particular design of invoice control means and printer to be described is premised, in part, on the assumption that an invoice in the form of FIGURE 16 is to be printed. If some other form of invoice were used the arrangement of components would have to be modified in a manner that will be obvious to those skilled in the art.

The invoice printer PZ, shown enclosed by broken lines, includes the basic elements of an ordinary electric adding machine. The printer PZ corresponds to the printer 8 of FIGURE 1. The ten columns of figures are printed by the print-add units P–1 through P–10, respectively. Each print-add unit is capable of printing any digit from 0 to 9. (This is indicated schematically in the drawing only for the print-add unit P–10.) Each of the print-add units P–1, P–2, etc. if provided with input electric leads P–11, P–21, etc., respectively which are shown as single lines in FIGURE 17 but each of which in fact comprises ten descrete leads, each lead being connected to the printer of a different digit in the print-add unit. For example, if, among the input lines P–11, an electric pulse is applied to the line corresponding to the digit 4, the print-add unit P–1 will print the digit 4, and (if the machine is instructed to add) 4 will be added to the right-hand column.

The invoice printer PZ is also provided with print-add control units Q-1 through Q-4 inclusive. The unit Q-1 instructs the invoice printer PZ to substract the information printed simultaneously with the application of a pulse to input lead Q-11 of the unit Q-1. Similarly, the control unit Q-2 instructs the print-add units to add the information printed at the same time as the unit Q-2 is actuated by a pulse applied to input lead Q-21. When the control unit Q-3 is actuated via lead Q-31 simultaneously with one or more print-add units, the information in the row is printed but not added. If the print-add control unit Q-4 is actuated via input Q-41, the row of figures is printed in red instead of in black.

The print-add units may be chosen so that units P-8, P-9 and P-10 never add, but merely print. The reason for this will be explained below.

The input lines P-11, P-21 and P-31 are connected to three sources of information; namely, a price control unit F, a counter V, and security control means U. The security control means U corresponds to the security control 2 shown in FIGURES 2, 3 and 4, the price control unit F corresponds to the unit 6 of FIGURE 1.

The inputs P-41 and P-51 are connected only to the security control means U. The input P-61 derives its information only from a quantity panel N. The print-add unit P-7 is not provided with any input, although it does function when more than 9 items are added to provide a total of 10 or more.

The print-add unit inputs P-81 and P-91 are connected to two sources of information; namely, connections TS-8 and TS-9 emanating from a stepping switch T, and leads M-8 and M-9 connected to a manual data input M. The input P-101 is connected only to the manual data input M.

The manual data input M provides the information at the upper left of the invoice shown in FIGURE 16 (numerals 259). The input unit M may comprise, for example, three individually adjustable ten-position switches which connect input leads M-1, M-2 and M-3 to a selected one of the ten lines included in the inputs M-8, M-9 and M-10 respectively. Thus, if the "numeral 9" line of the input lines M-8 is connected by a switch (not shown) in the manual data input M to the input lead M-1, then whenever a pulse appears on the input line M-1 leading into the manual data input M, the printer P-8 will print the numeral 9. Similarly, the switches (not shown) for lines M-9 and M-10 are set to actuate the printing of the desired digit in the print-add units P-9 and P-10 respectively when a pulse is applied to leads M-2 and M-3 respectively.

The stepping switch T, as will be described in greater detail below, is a conventional stepping switch of the type used in dial telephone installations. A standard commercially-available stepping switch provides 50 switching positions. In the present example, it is assumed that 200 individual positions are required, corresponding to 200 discrete commodities available for sale. Thus, four of the commercially-available switches would be required, but these are not shown separately in FIGURE 17. Rather, the stepping switch T schematically represents four commercially-available stepping switches each having layers and together providing 200 switching positions. The eight layers are identified as T-1, T-2, T-3, T-6, T-8, T-9, TG and TE in FIGURE 17.

The switch layers T-8 and T-9 are connected to input leads P-81 and P-91 respectively so as to make possible the pringting of 200 merchandise code numbers. This is accomplished as follows:

Each of the 200 switching positions in the layer T-8 is connected to a selected one of the ten lines included in the lead TS-8 connected to the input P-81 of print-add unit P-8. The first switch position of layer T-8 is connected to the numeral 1 line of the input P-81, the second position of switch layer T-8 is connected to the numeral 2 line of the input P-81, etc.; the ninth position of the switch layer T-8 being connected to the numeral 9 input of the print-add unit P-8. The tenth position of layer T-8 is connected to the zero line among the inputs P-81, the eleventh position in the switch layer T-8 is again connected to the numeral 1 input line of P-81, etc., each decade of switch positions being connected in the same sequence as the first decade.

For the switch layer T-9, the first nine positions of the switch layer are unconnected. The next ten positions are connected to the numeral 1 line of lead P-91, the next following ten to the numeral 2 line of the input P-91, etc. Thus it can be seen that as the stepping switch T steps through the first 99 positions, the print-add units P-8 and P-9 would, if actuated at each position, print sequentially the numerals 1 through 99. Of course, a purchaser would ordinarily select only a portion of the available commodities, and only the code numbers of selected commodities are printed, in a manner to be described below. Simply, the print-add units P-8 and P-9 print only when the stepping switch T has stopped at a selected switch position corresponding to the code number of a selected article.

While the foregoing explains how the first 99 merchandise code numerals are printed in columes 8 and 9, it does not explain how products having code numbers of 100 or greater are printed. The numeral 1 in the extreme left-hand column (printed by the print-add unit P-10) is provided by a discrete input DP-10 leading to the print-add unit P-10. (This input is in fact connected to the numeral 1 line of the inputs P-101 but is shown separately in FIGURE 17 for purposes of explanation). When a commodity whose code number is greater than 99 and less than 200 is selected, a special switch is actuated which provides an input to the terminal DP-10, thereby directing print-add unit P-10 to print the nmeral 1. For the 200th item, a special switch leading to the numeral 2 lead is closed (the lead is again for purposes of explanation, shown separately as DP-20 in FIGURE 17).

Ordinarily, the dispenser will dispense only one item of any commodity selected. However, there may be instances in which two or more items are sold in combination (for example, three bars of a certain brand of soap for 25¢). The quantity panel N makes provision for such contingencies. The 200 switch positions of the switch layer T-6 are connected through the quantity panel N to a discrete one of the ten lines comprising the lead N-6. Quite obviously most of these switching positions will be connected to the numeral 1 line, but some of the positions, as in the case of the hypothetical three bars of soap sold together, may be connected to a line corresponding to some other numeral.

The 200 positions of the switch layers T-1, T-2 and T-3 are connected through a price control unit F to discrete ones of the ten lines comprising the output leads F-1, F-2 and F-3 respectively leading from the price control unit F. Thus, if commodity number 1 has a value of 51¢, position number 1 of switch layer T-3 would be unconnected; position number 1 of switch layer T-2 would be connected through the price control unit F to the numeral 5 line of the lead F-2 (and thence to the numeral 5 input line of the input P-21); and the first position in the siwtch layer T-1 would be connected to the numeral 1 line of the lead F-1 (leading to the numeral 1 line of the input P-11). Likewise, if commodity number 84 has a value $4.07, position 84 in switch layer T-3 would be connected through price control unit F to the numeral 4 line of lead F-3; the 84th position in the switch layer T-1 would be connected to the zero line of lead F-2 (or would be unconnected); and the 84th position of the switch layer T-1 would be connected through the price control unit F to the numeral 7 line of lead F-1. Thus, if a consumer selected the commodity having the code number 84, the print-add units P-3, P-2 and P-1 would be actuated to print, in the three right-hand columns, 407.

The price control unit F may be a simple connecting panel. FIGURE 19 illustrates a portion of a price panel that may be used to connect the print-add control units to the switch layers T1, T2 and T3. Two merchandise code number 36 and 37 are shown in FIGURE 19 by way of exemplification, it being understood that the panel extends to all 200 code numbers. As can be seen in the drawing, for each commodity there are three columns of contacts 501, 502, 503 preferably in the form of sockets, each identified with a numeral from 0 to 9 inclusive. The zero row of contacts is optional; the print-add units P–1, P–2 may be of the type that automatically enters a zero if the printer is instructed to add and a pulse is applied to at least one print-add unit but no stimulus is applied to input leads P–11 or P–21.

The left-hand column of contacts 503 represents dollars, the middle column of contacts 502 represents multiples of ten cents and the right-hand column of contacts 501 represents the range 1 to 9 cents. Each of the contacts 503 in the dollar row is connected to a corresponding input of the print-add unit P–3, which prints the third column from the right. Likewise, the middle column of contacts 502 is correspondingly connected to the print-add unit input J–21, and the right-hand column of contacts 501 in the price panel is connected to the corresponding series of inputs P–11.

Extensible leads 511, 512, 513 are connected on the under surface of the price panel to the associated switch position of the stepping switch T. Thus, for the 36th merchandise code number, lead 511 is connected to the 36th switch position of layer T1; lead 512 is connected to the 36th position of layer T2; and lead 513 is connected to the 36th position of layer T3. The leads 511, 512, 513 are provided with contact plugs 521, 522, 523 respectively, which are adapted to engage the sockets 501, 502, 503. By selecting the sockets into which the plugs are inserted, the operator is able to set the price of each commodity. By way of example, the commodity having the code number 36 is priced at 89¢ per quantity of items dispensed. Similarly, commodity number 37 is priced at $1.39.

The counter V is provided with three switches (not shown) leading to leads V–1, V–2 and V–3 from respective inputs V–11, V–21 and V–31. Such switches may be ten-position stepping switches, so that the switch connected to the input V–11 steps one position to the next highest number following the completion of each purchase. Likewise, the switch connected to the input V–21 steps to the next highest number whenever the switch connected to the input V–11 moves to the zero position. The switch connected to the input V–31 likewise steps up one position whenever the switch connected to the input V–21 moves to the zero position. It is contemplated that the operator of the vending apparatus will reset all switches to zero at the beginning of each day, or the beginning of each week, etc., as required.

The security control device U includes five switching units (not shown) each of which may be connected to one of ten outputs. The ten outputs for each switch are designated as U–1, U–2, U–3, U–4 and U–5 in FIGURE 17. When a purchaser inserts his credit card together with his selector card (or as the case may be), the identification information contained in the purchaser's cards causes the setting of the five switch units of the security control device to a unique combination of switching positions, and this setting is transferred via leads U–1 through U–5 inclusive to the print-add units P–1 through P–5, respectively. The manner of obtaining the information from the cards is not considered to be part of the present invention; all that is necessary is that any appropriate connecting means be used to transmit the information to the print-add units. The detailed operation of the print-add units and print-add control units, the manual data input, and the counter will not be described further because these are known devices commercially available or easily designed by those skilled in the art.

As mentioned previously, the invoice shown in FIGURE 16 is so arranged to print preliminary information first and thereafter to print information representative of the price, quantity and code number of the items selected by the purchaser, eventually resulting in a total of the number of items and a total of the prices of the selected commodities. The sequence of operations resulting in the printing of the preliminary information first, followed by the printing of the selected commodity information is controlled by the circuitry of FIGURE 7 in combination with certain additional circuitry shown in FIGURE 18. The overall sequence of operations is effected by a ten-position three-layer stepping switch TX analogous to the stepping switch T shown in FIGURE 14. (In fact, a nine-position switch would suffice for the example under discussion but the ten-position switch is a standard commercial product.) The first layer comprises a home position A–0 and ten stepping positions A–1 through A–10 inclusive. These ten contact positions are sequentially contacted by a stepping contact A, which in the rest position of the switch is normally in contact with the homing position contact A–0. While the contacts are shown, for purposes of explanation, as linearly spaced in FIGURE 18, it is to be understood that in practice the contacts would be arranged in a circle so that from position A–10 it would be only a short step to the homing position A–0.

Similarly, the other two layers of the ten position stepping switch TX comprise a homing position B–0 and stepping position B–1 through B–10, and a homing position C–0 and stepping positions C–1 through C–10 respectively.

The stepping switch T is shown in FIGURE 17 as having four sections TA, TB, TC and TD. Switch TA provides switch positions 1 to 50, TB provides positions 51 to 100, TC provides positions 101 to 150, and TD provides positions 151 to 200, in accordance with the hypothesis made that only 200 different commodities are sold. The principle of construction and operation described may, of course, be modified in accordance with any other number of commodities to be vended.

The ten-position stepping switch is caused to step when a circuit to ground is made and then broken through a coil LS connected to one terminal D–1 of a DC source (not shown). The circuit to ground (to which the other terminal of the DC source is connected) from the coil LS may be completed through interrupter S2 and switch SH and thence through the stepping contact B when the stepping switch is in the 8th position. Switch S4 is a home switch closed only when switch TX is in its home position. Another route to ground is via contacts A–1, A–2, A–3, A–9 and A–10 via moving contact A and switches S–3 and S–4 when said switches S–3 and S–4 are both closed. A further path to ground exists through switch S–1 and interrupter S–2, thence to the contact B–0 and thence to ground via stepping contact B when the switch TX is in the homing position. A final route to ground exists via any of the relay contacts RA–2, RB–2, RC–2 and RD–2.

When a purchaser inserts the correct combination of credit card and selector card (or as the case may be), switch S–1 closes (in response for example, to the closing of switch 62 in FIGURE 1 of applicant's patent application Ser. No. 533,682) causing the coil LS to be grounded via the two switches S–1 and S–4 and the moving contact B, which is connected to ground when TX is in its home position. Interrupter S–2 opens the circuit to cause the stepping switch TX to move to its first position whereupon contact C–1 is grounded, causing current to flow from a DC terminal D–3 through a relay coil L–1. The relay coil L–1 actuates relay contacts R–1A through R–1H (see FIGURE 17), which accordingly close. A further contact RN (see also FIGURE 20) is closed by the relay coil L–1. The closing of the contact RN results in the application of a pulse, by means to be described in detail below, to terminal DP (see FIGURE 17). This pulse is applied to all the parallel lines which have been closed by the closing of the relay contacts R–1A through R–1T inclusive. It can be seen that a line is closed through lead Q–41 to the "red" control unit Q–4, and through Q–31 to the "non-add" control unit Q–3. This means that in the first position of the stepping switch TX, the information printed by the print-add units as a result of the application of the pulse to DP will be printed in red and will not be added. The particular numerals printed result from the closure of relay contacts R–1C through R–1H. It can be seen that contacts R–1C through R–1E close circuits leading via lines M–1, M–2 and M–3 to the manual data input M thereby printing, in the three left-hand columns, as a result of actuation of print-add units P–10, P–9 and P–8, three numerals corresponding to the information inserted in the manual data input M by the operator of the vending apparatus Similarly, the three right-hand printers P–1, P–2 and P–3 are actuated via leads V–1, V–2 and V–3, which have been connected via the counter switches through leads V–11, V–21 and V–22 to closed relay contacts R–1F, R–1G and R–1H and thence to the input pulse terminal DP. Thus, the numerals registered in the counter are printed in the three right-hand columns of the invoice.

When an impulse is applied to the non-add control Q3, the add total control Q2 or the minus control Q1, the printer runs through one cycle. When the printer runs through one cycle, it makes switches S4 and S3. As soon as the printer starts, switch S4 breaks its connection to switch RN and makes a connection with switch S3. When the printing cycle is completed, S4 breaks its connection with S3 and makes a connection with switch RN. Switch S3 makes a momentary contact through switch S4 to ground just before the printing unit has completed its cycle and it is this momentary contact made through S3 which causes the stepping switch TX to advance.

In position number two, a ground is completed from terminal D–3 through the relay L–2 via contact C–2 and moving contact C (which is always grounded). The relay contact RN and relay contacts R–2A through R–2G inclusive are closed as a result of current flow through relay coil L–2. The resulting pulse applied to terminal DP actuates the "not-add" and "red" print-add control units Q–3 and Q–4 via lines Q–31 and Q–41, and the information printed is that provided by the security control device U, which has been connected to the input pulse supplied to D–7 via leads U–11 through U–51 and closed contacts R–2C through R–2G inclusive. The five right-hand print-add units P–1 through P–5 therefore print numerals corresponding to the information provided by the security control device U, and this information is, because of the actuation of Q–3 and Q–4, printed in red and not added.

Again the completion of the printing operation results in completion and breaking of a circuit to ground through the relay coil LS via contact A–2 and moving contact A. This results in the stepping of the switch TX into position number three.

In the third position, the relay coil L–3 is grounded via contact C–3. Closure of relay coil L–3 results in the closure of relay contact R3D (FIGURE 13), relay contact RN, and relay contacts R3A, R–3B and R–3C (FIGURE 17). This simply results, as can be determined by tracing the lines connected to the terminals, in the printing of a red minus sign. Again the printing operation terminates in closure of switches S–3 and S–4, completing a circuit through LS once again via contact A–3.

It will be noted that in the third position of switch TX, terminal DA–1 of stepping switch TA was grounded via contact B–3. The application of a ground via this terminal to the stepping switch TA cocks it so that interruption of the ground circuit to terminal DA–1 results in the stepping of the switch from its home position to switch position number 1. Thus, when the coil LS causes the ten position stepping switch TX to move into position number four, the ground circuit is interrupted to terminal DA–1. When the stepping switch TA moves off its home position, it closes contact RA–1 through an interrupter (not shown). This permits the stepping switch TA to begin stepping through its 50 positions. The switch TA continues to step as long as terminal DA–2 is grounded, via relay contacts RG–2 and RA–1.

When the ten position switch TX moves to the fourth position, causing the stepping switch TA to step, it at the same time has cocked the next following stepping switch TB as a result of application of a ground to the terminal B–4, and has completed a circuit to ground from the terminal D–3 through the relay coil LT via contact C–4. The relay contact LT closes relay contact RTQ and contacts RT–1, RT–2, RT–3, RT–6, RT–8 and RT–9 (FIGURE 17).

The stepping operation of the switch TA is interrupted only when the ground to terminal DA–2 is interrupted. This happens when the moving contact of the contact layer TG (FIGURE 17) is grounded via one of the 50 positions of the layer TG comprised in switch TA. A position on layer TG is grounded as a result of the selection operation of the purchaser. When the purchaser inserts his selector card (or pushes buttons, etc., as the case may be), selector switches G–1, G–2, etc., having position numbers corresponding to the code numbers of the articles selected are closed. Thus, for example, if the purchaser has selected the 1st, 5th and the 9th commodity listed, the 1st, 5th and 9th positions of the switch layer TG will be grounded. (Of course, the switch TA is affected only by the grounding of the positions 1 through 50; the higher-numbered positions appear on the switches TB, TC and TD.) While FIGURE 17 shows in representative fashion, only five selector switches G–1, etc., through a ground may be made to the contact layer TG, it is understood that there are 50 selector switches for each of the stepping switches TA through TD; i.e., a total of 200 switches. Thus there are in reality selector switches G–1, G–2 . . . G–200.

When the stepping switch TA reaches a grounded position through one of the switches G–1, etc., a circuit is completed through a relay coil LG from a terminal D–2 connected to a source of DC current. When the relay LG conducts current, it opens contact RG–2, and closes contact RG–1. The opening of contact RG–2 interrupts the path to ground from terminal DA–2, thereby causing the switch TA to stop stepping.

The contact RG–1 is in parallel with the contact RN and therefore causes the application of an impulse to the terminal DP. This impulse causes the printing of numerical information by print-add units P–1 through P–3, P–6, P–8 and P–9 as a result of the closure of relay contacts RT–1, RT–2, RT–3, RT–6, RT–8 and RT–9. Because the contact RTQ is closed, the "add" control unit Q–2 is actuated and therefore the information printed is added. It is understood of course that during the printing operation all stepping contacts in the stepping switch T are stationary, because the switch has stopped moving as a result of the grounding of a selected one of the switches G1, etc. The printed information, as described above, includes the price of the article in the first three columns because of the connection of print-add units P–1, P–2 and P–3 to the impulse terminal DP via the price control unit F, the stepping switch contact layers T–1, T–2 and T–3, and then via the stepping contacts thence through RT–1, RT–2 and RT–3. The print-add unit P–6 prints the appropriate quantity of the selected commodity as a result of its connection to terminal DP via relay contact RT–6, the position of switch layer T–6 corresponding to the selected commodity, the quantity panel N, and the input P–61 of the print-add unit P–6. Finally, the print-add units P–8 and P–9 print the code number of the commodity because of the connection of these two print-add units to the terminal DP via relay contacts RT–8 and RT–9, switch layers T–8 and T–9 and the leads TS–8 and TS–9 which actuate inputs T–81 and T–91. Because there is no reason to add up the several code numbers printed, units P–8, P–9, and P–10 are preferably designed so that they merely print and do not add.

By way of example, in the invoice shown in FIGURE 16, the article bearing code number 9 was selected. In this circumstance, selector switch G–9 would be closed, forcing the stepping switch TA to stop at position 9. In this position, contact number 9 of switch layer T–1 is connected via the price control unit F to line 9 of input P–11, and contact number 9 of switch layer T–2 is connected via the price control unit F to line 3 of input T–21. Thus the print-add units P–1 and P–2 print 39¢ as the price of article number 9. Likewise, the quantity panel N is connected at position number 9 of switch layer T–6 to line number 2 of the input P–61. This causes the print-add unit P–6 to print the numeral 2 in the sixth column. Finally, contact number 9 in switch layer T–9 is not connected, and contact number 9 in switch layer T–8 is connected to line number 9 of the input P–81, causing the numeral 9 to be printed in the eighth column. Because the "add" control unit Q–2 was stimulated by the same input pulse, all the information in the row is added (with the possible exception of the code number, as mentioned above).

Following the completion of the printing operation, the switches S–3 and S–4 are actuated, as usual. However, this does not result in the application and interruption of a ground to coil LS because the switches S–3 and S–4 are, in the fourth position of the ten position switch TX, connected via contact A–4 to the stepping switch TA via terminal DA–1. The application of a ground to terminal DA–1 results in the stepping of the stepping switch TA to the next position. The switch TA then steps (terminal DA–2 again being grounded through contact RG–2) until it reaches another grounded position of the layer TG, whereupon the foregoing procedure repeats itself. Thus for the invoice of FIGURE 16, it is seen that the stepping switch TA would stop at positions 1, 5 and 9.

When any of the storage units becomes empty, a modification of the foregoing operation occurs. In this instance an empty switch is closed, as described above (the switch is labelled 106 in FIGURE 7, 157 in FIGURE 10). Such empty switches are labelled E–1, E–2 . . . E–200 in FIGURE 17. The switch E–1 corresponds to the storage unit containing the commodity with code number 1, the switch E–2 to the unit housing merchandise corresponding to code number 2, etc., up to E–200 for the 200th commodity.

Thus, if one of the items of merchandise selected by the purchaser is no longer in stock, when the stepping switch T stops at the empty position, the corresponding empty switch will provide a ground for the relay LE. The relay coil LE actuates five relay contacts REA, REB, RE–1, RE–2, and RE–3. The contact REA switches terminal DP from line Q–21 to Q–31 and the invoice printer makes a corresponding adjustment whereby the unavailable item selected by the purchaser is not added into the invoice. At the same time, the switch REB actuates the "red" control unit Q–4 thereby effecting the printing of the selected item in red. Contacts RE–1, RE–2 and RE–3 are actuated by the coil LE to interrupt current flow through the price control unit F. This prevents the price of the unavailable item from showing. It is contemplated that this will be more acceptable to a purchaser, who will feel that when the price is absent on the invoice, he is clearly not paying for the absent merchandise.

The operation of the empty switch circuitry may be modified in accordance with the discussion relating to FIGURE 14, where more than one storage unit contains the same merchandise.

When the stepping switch TA moves past the 50th position into its homing position, homing switch contact RA–1 opens and contact RA–2, which had closed when switch TA moved off its home position, opens. Opening of the contact RA–1 breaks the ground circuit to terminal DA–2, causing the stepping switch TA to stop stepping.

The reopening of the homing switch RA–2 in the home position of switch TA causes the ground circuit which had been made to the relay coil LS to open, thereby causing the stepping switch TX to move to position number five. In position number five stepping switch TB is connected via terminal DB–1 to ground and begins stepping through its 50 positions in the same manner as stepping switch TA. The operation of this switch is entirely similar to that of switch TA. It will be noted that the relay LT remains connected to ground via terminal C–5 in the fifth position of the ten-position stepping switch TX. Thus products selected having code numbers 50–100 are invoiced.

Following completion of the stepping of the switch TB, contact RB–2 reopens, again breaking the ground circuit to relay coil LS and thereby causing the ten-position switch TX to move into position number six. This connects stepping switch TC, whose operation is again the same as that of stepping switches TA and TB with one minor modification, this being the operation of contact RC–3. When the stepping switch TC–3 begins stepping, this contact closes, providing a circuit from terminal DP through the relay contact RC–3 to the numeral 1 input of print-add unit P–10. This is shown figuratively as a separate input DP–10 although it is understood that it will ordinarily be simply the numeral 1 input among the ten leads of the input P–101. (A contact RB–3 in parallel with contact RC–3 closes in the 50th position of the switch TB, causing the printing of the numeral 1 for the commodity having code number 100.)

In position seven of the ten position-stepping switch TX, the 50-position stepping switch TD is connected and its operation is the same as that of the stepping switch TC with the exception that when it reaches the 200th position, relay contact RD–3 opens and relay contact RD–4 closes, permitting the pulse from D–7 to be applied to input DP–20 of print-add unit P–10. This causes the print-add unit to print the numeral 2 (and of course the print-add units P–9 and P–8 will both print zero) for the commodity having code number 200.

When relay contact RD–2 reopens to break the ground to the coil LS, the stepping switch TX steps into position number eight. This is an empty position of the stepping switch and, if a nine-position stepping switch were readily available, the empty position would not have to be provided, in the example selected for discussion. But if the standard ten-position stepping switch is used, it is necessary to have one empty position. Accordingly, the terminal B–8 provides a ground via contact B and interrupter S–2 to the coil LS so that the switch TX moves into position number nine. In this position, relay contact RN is closed and a relay L–9 closes the contact R–9 leading to the "add" control unit Q–2. The add unit Q–2, when stimulated in the absence of any other information leading to the print-add units, causes the print-add units to print the total of the information previously printed. This manner of operation is well known in the adding-machine art. It will be noted that the total of the prices may require more than three columns, which is the reason for placing the quantity information in the sixth column. The quantity total may also require more than one column, which is the reason for the extra print-add unit P–7.

Completion of the ninth cycle whereby the totals are printed results in momentary closure of switches S–3 and S–4 as usual, this time through contact A–9. This causes the ten-position switch TX to move into its tenth position in which contact RN closes and the relay coil L–10 operates. The relay coil L–10 simply closes the contact R–10 causing the "add" unit Q–2 to print a zero total (or nothing at all—the object being simply to advance the roll of paper so that it can be readily ripped so as to detach the purchaser's invoice). Again following completion of the print cycle, switches S–3 and S–4 close through contact A–10 to make and break a ground to coil LS thereby to cause the ten position switch to return to its homing position. There being no ground to the coil LS, there is no further action until switch S–1 is closed once again.

Figure 20:
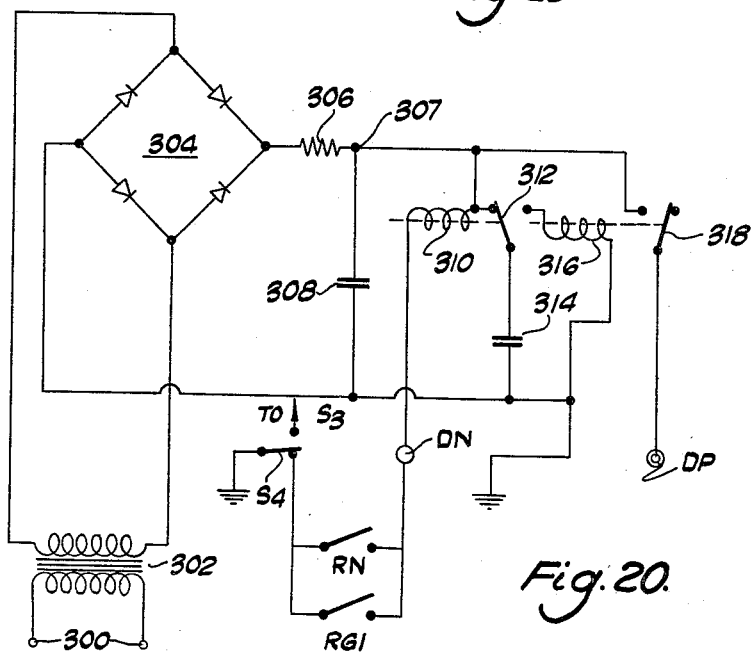
FIGURE 20 is a schematic diagram illustrating the circuit for producing the pulse used to operate the invoice printer.

FIGURE 20 illustrates the pulse-producing circuit for providing the pulse at terminal DP in FIGURE 17, used to actuate the invoice printer. The pulse circuit is supplied with an AC voltage applied across terminals 300, which is transformed to the required operating voltage for the circuit by a transformer 302 and rectified in a rectifying network 304. The DC output of the rectifier 304 is applied through a resistor 306 to charge, via a terminal 307, a condenser 308 having a relatively high capacitance. It will be noted that one side of the capacitor 308 is connected to ground. Also connected between the terminal 307 and ground is a network comprising a relay coil 310, parallel relay contacts RN and RG–1, and the switch S–4. (Elements RN, RA–1 and S–4 also appear in FIGURE 18.)

It is to be understood that contacts RN represent contacts closed by relays L–1, L–2, L–3, L–9 and L–10, and that accordingly there may be five sets of parallel contacts instead of the single set showing. The relay coil 310 controls a contact 312 which is normally connected between the points 307 and one terminal of capacitor 314, the other terminal of which is connected to ground. The open terminal of the relay contact 312 is connected to one terminal of a coil 316 whose other terminal is connected to ground. The relay coil 316 actuates normally-open contacts 318 leading from the terminal 307 to the terminal DP.

The operation of the circuit of FIGURE 20 is as follows. The circuit is triggered by the closing of either the relay contacts RN or the relay contacts RG–1. (It will be understood that the trigger is provided by any one of the sets of parallel relay contacts RN, actuated by any one of the relays L–1, L–2, L–3, L–9 and L–10.) When the relay contacts RN or the relay contacts RG–1 are closed, the relay coil 310 operates to connect the coil 316 to the capacitor 314. The discharge current passing from capacitor 314 through the coil 316 closes the relay contacts 318, thereby permitting capacitor 308 to discharge through the circuit connected to the terminal DP. It will be observed that the duration of the impulse flowing to the circuit connected to terminal DP is controlled by the time required for capacitor 314 to discharge sufficiently so that the coil 316 no longer keeps the relay contact 318 closed.

Selection of merchandise and purchaser identification

The means of identifying the purchaser and selecting the particular merchandise desired preferably comprises any combination of known selection-registering devices together with the security control device described in applicant's copending application Ser. No. 533,682. For example, the purchaser may insert an identity card bearing certain information sensed by the security control device, and at the same time may make his selection of merchandise using selector push-buttons that close corresponding switches SS1, SS2, etc., in FIGURE 13 and that also close corresponding switches G1, G2, etc., in FIGURE 17. Two other methods of registering a selection will be described herein.

FIGURES 21–24 illustrate a form of selector card 239 that can be used by a consumer. The card is provided with a series of purchaser identification eyelets or wells 240 that are open to a predetermined extent from the top of the card. For example, the far left-hand well 240 seen in FIGURE 21 is open to penetration up to about three-quarters of its overall depth, whereas the far right well 240 is open only to the extent of about one-quarter of its overall depth. The extent to which any well of any particular card is open is governed by the identification number of the purchaser who bears it.

When the card 239 is inserted into the card sensing means (FIGURE 25, not shown in full), the wells 240 are engaged by a plurality of spring-loaded projecting pins 246 slideably supported on a frame 249 and longitudinally spring-loaded by springs 247. The springs 247 tend to force the pins 246 to the left to assume the position shown. There are as many pins 246 as there are wells 240, and the spacing of the pins conforms to the spacing of the wells, so that each pin engages one well. Thus, when the card 240 is inserted into the card sensing means, the wells 238 come into contact with the ends of the projecting pins 246 and the pins are forced more or less to the right (as seen in FIGURE 25) depending upon the length of the open portion of the well.

Attached to each projecting pin 246 is an electrical contact 248 bearing against an associated panel 250 of contacts 251 fixed by means (not shown) to the frame 249 or other portion of the housing for the selector card sensing means. The sliding contact 248 is connected through a discrete one (depending upon the length of the open portion of the corresponding well) of the contacts 251 to an appropriate contact (not shown) of the security control device. The number of contacts 251 in each panel will of course, be governed by the design of the security control device. If all the contacts 248 are in positions corresponding to the information contained on the purchaser's identification card inserted and sensed simultaneously with the selector card, the security control device registers that the purchaser's identification is satisfactory and the invoicing and dispensing operations, etc., are permitted to proceed. (FIGURE 25 corresponds to FIGURE 8 of applicant's patent application Ser. No. 533,682, to which reference may usefully be made.)

Referring again to FIGURE 21, the card 239 is provided on each face with a series of openings 234 each of which can be blocked by means of an associated sliding panel 216 (see FIGURES 23 and 24) that is provided with an upstanding flange portion 218 projecting through a corresponding slot 220 adjacent the associated opening 234. Each of the openings 234 is numbered in accordance with the commodity code number to which it corresponds. In FIGURE 21, by way of example, only a few of the 100 openings are indicated; the other 100 are of course on the opposite face of the card.

The card of FIGURE 21 is shown in cross-section in FIGURE 24. It can be seen to comprise an inner support 233 having an upper wider portion bearing the wells 240 and a lower narrower portion forming the under-surface of the channels in which the slides 216 are slidably mounted. The panels 216 slideably engage the surface 208 of the inner structure 234 and are held in place by external walls 222 bearing against recessed faces 210 of the inner support structure 233 and against a shoulder 204 formed therein. Openings 234 and slots 220 are formed in the covering walls 222. (See FIGURE 23.)

As can be seen in FIGURES 23 and 24, the sliding member 216 is provided with a stud 228 mounted on a finger 226 of small dimensions so as to be separated by a gap 224 from the rest of the body of the slide 216. This construction lends flexibility to the finger 226. Also provided in the under-surface of the upper cover 222 of the selector card are a pair of slots or channels 230, 232 (see FIGURE 23) adapted to be engaged by the stud 228. When the slide 216 is in its rest position, the stud 228 engages the slot 232 and the corresponding opening 234 is not blocked, but when a purchaser selects the particular item of merchandise associated with the opening 234, the purchaser moves slide 216 by means of the flange 218 into a position covering the inner portion of the hole 234, and the slide 216 is locked there by the engagement by the stud 228 of the channel 230. Of course, finger pressure is sufficient to move the slide 216 from one locked position to the other.

FIGURE 26 illustrates a sensing mechanism, generally indicated as 200, for use with the selector card shown in FIGURES 21–24. This mechanism will ordinarily be shielded from the purchaser by an appropriate housing 251, the only openings in the housing being a slot for the insertion of the identity card (see slot 15 of FIGURE 5) and a slot (not shown, but see slot 21 in FIGURE 5) opposite plates 242 into which the selector card may be inserted so as to pass between the plates 242.

The mechanism 200 comprises an upper slideable sensor unit 262 and a lower slideable sensor unit 264. The two units 262 and 264 are movable vertically along guideways 274, which are slideably engaged by projecting portions 249 of the ends of the units 262 and 264.

The sliding motion is imparted to the units 262 and 264 by means of arms 270 and 272 attached to brackets 271 and 275, respectively, the latter being fixed to the units 262 and 264, respectively. The arms 270 and 272 are pivotally connected to a crank 69 fixed to a shaft 267, which is rotated by a source of power (not shown). The crank 269 operates, in response to any convenient switching means, to draw the units 262, 264 together and to press against the plates 242 when a selector card 239 is inserted between the plates 242. The crank 269 operates to separate the units 262, 264 at some convenient time near the latter part of the vending operation, permitting the card 239 to be withdrawn.

Figure 18:
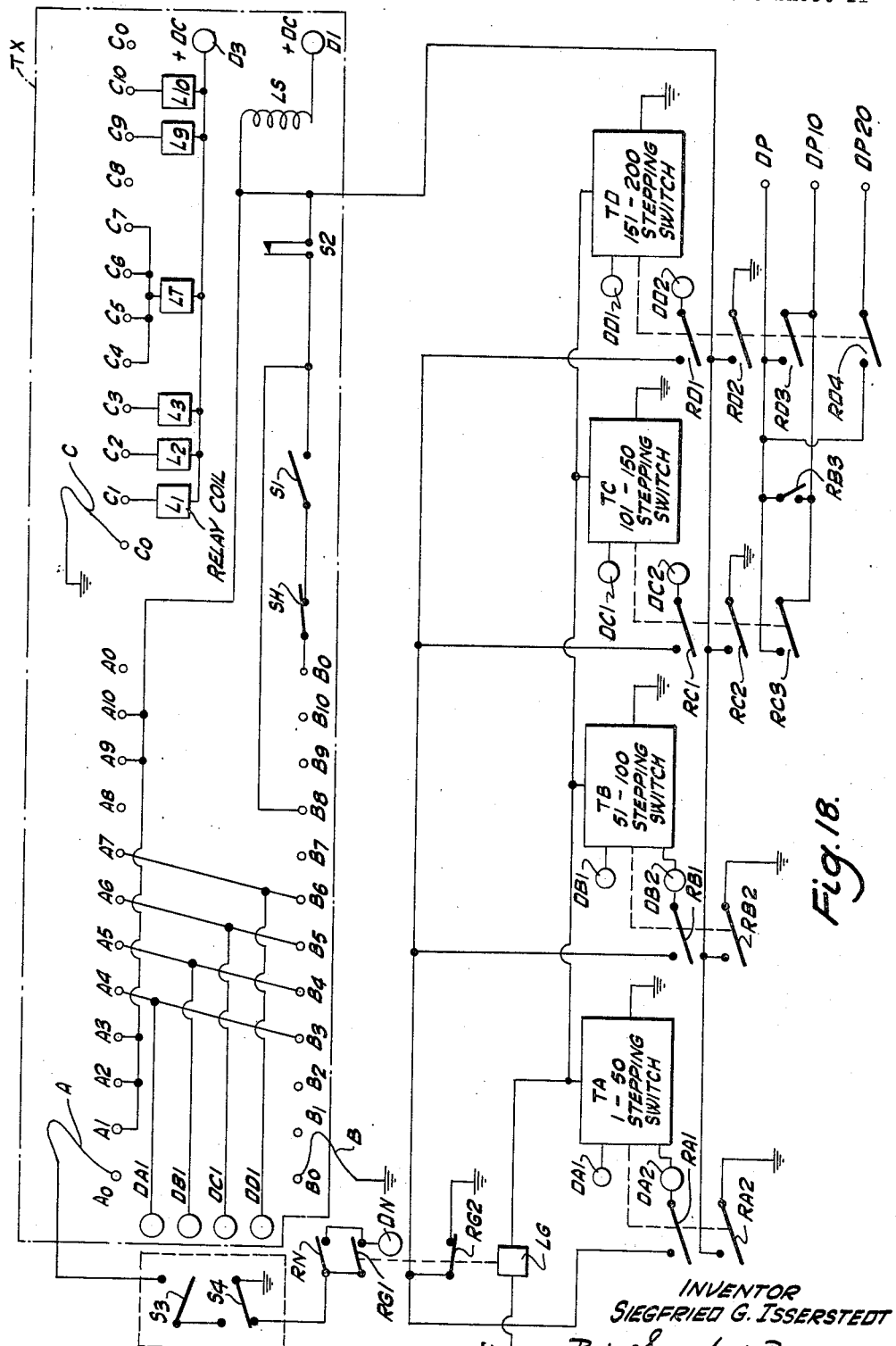

The units 262, 264 may, for example, be moved together following closing of latching relay contacts (not shown) operable by relay coil L–1 (FIGURE 18), and may be drawn apart following unlatching and opening of these contacts by relay coil L–10 (FIGURE 18).

When the purchaser inserts a selector card 239 into the space between plates 242, it is retained by a catch (not shown) so that the card cannot be removed until units 262 and 264 have been moved together and separated again. Therefore, if non-matching identity and selector cards result in the sounding of an alarm as discussed in applicant's patent application, Ser. No. 533,682, the selector card and the identity card cannot be removed and are retained by the sensing apparatus.

The plates 242 are fixed to the housing 251 by means not shown and, as stated, are adapted to receive between them the selector card 239 of FIGURE 21. The plates 242 are provided with holes 252 which match the openings 234 on the selector cards 239. On the underside of the sensor unit 262 and on the upper side of the sensor unit 266 are a plurality of spring-loaded projecting sensing pins 254 adapted to penetrate the holes 252 and, when a selector card 239 is present in the unit, are adapted to penetrate the openings 234 in the selector card when the crank 269 operates to bring the units 262, 264 into contact with the plates 242. If the holes in selector card 239 are unblocked, the pins 254 will project into the selector card, but if any openings 234 in the selector card 239 is blocked by means of the associated sliding panel 216, the corresponding pin 254 will not be able to penetrate the opening 234 completely but will remain in a withdrawn position.

Each of the pins 254 may be connected to a two-throw two-position switch (not shown) in the interior of the units 262, 264 which operates so that the switch is in one position if the corresponding pin 254 is fully extended and is in its other position if the corresponding pin is in a withdrawn position as a result of the blocking of the pin 254 by a slide member 216 covering an opening 234 in the selector card 239. One throw of the switches corresponds to the switches G1, etc., of FIGURE 17 and the other throw corresponds to switches SS1, etc., of FIGURE 14. Lead wires 277 emanating from the switch connections are connected to the necessary associated contacts (not shown) in the dispenser and invoice printer.

FIGURE 27 illustrates a conventional punch card that can be used in lieu of an identity card. The punch card is intended to be used in combination with a memorized code number that can be registered by means of manually-adjustable dials or the like. It is contemplated that a purchaser will be provided with a booklet containing a plurality of such punch cards. The punch card of FIGURE 27 is provided with a series of columns of information, some of which are provided on the card as issued to the purchaser, and some of which is entered on the card by the vending apparatus at the time of making a purchase.

Some of the information on the punch card represents the identity of the purchaser. Some of the identity information punched on the card corresponds to certain other punched information contained on the same card. The remainder of the identity information punched on the card must be matched with the manually-adjustable code number that the purchaser registers on the manually-adjustable dials or the like provided on the housing for the vending machine or at some other convenient location. The identity information is sensed by the security control device described in the aforesaid copending application Ser. No. 533,682, whereby the security control device compares some of the information on the card with certain other information on the card, and will compare still further information on the card with the information registered on the manually-adjustable control dials.

For example, in FIGURE 27, the positions of a set of holes punched in the first six columns (say) of punched information are compared by the security control device with another series of holes punched in the same six columns. The next five columns (say) of the punched information are compared with the information registered on the manually-adjustable dials. If the information thus sensed by the security control device establishes a proper correspondence, the vending operation will proceed and the purchaser thus identified will be charged with the purchase.

If a punch card such as shown in FIGURE 27 is used, it may be retained in the machine until the vending cycle is complete. Commercially-available equipment may be used to punch holes into this card and to stamp information on the card showing the total price of the purchases, customer and vendor identity, etc. The required impulses for such operation may be obtained, by conventional methods, from the circuits described above. This would permit completely automated billing, inventory control, purchasing data and sales analysis.

Figure 28:
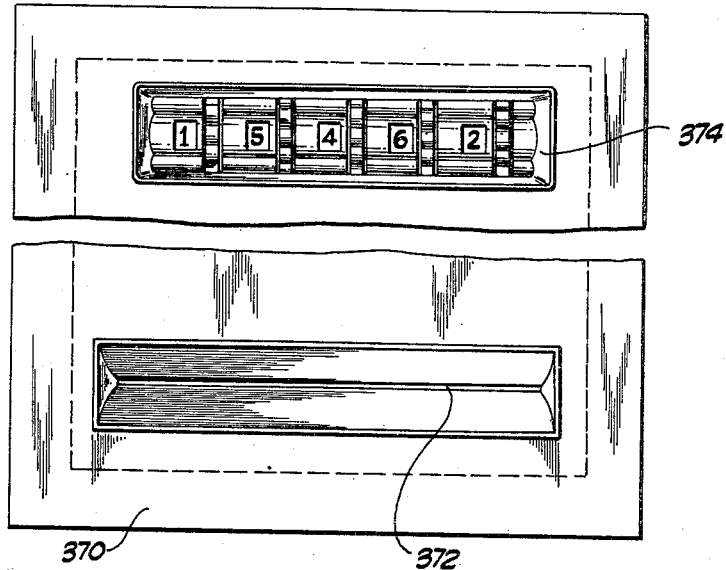
FIGURE 28 (on the same sheet as FIGURE 20) illustrates a portion of a panel for use in association with the card shown in FIGURE 27.

FIGURE 28 illustrates a housing appropriate for the reception of the punch card shown in FIGURE 27. The housing includes a front panel 370 having a slot 372 disposed at a convenient location for the reception of the punch card. Above the slot are a series of five manually-adjustable dials 374 each of which bears the numeral sequence 0 to 9. The purchaser may use his fingers to adjust each of the five dials to a setting corresponding to any numeral between 0 and 9. The purchaser must, of course, enter his memorized code number on the dials in order to match the information on his punch card; otherwise he cannot effect the vending operation. If an erroneous card is inserted, or if an erroneous setting of the dials 374 is registered, the result is that an alarm is set off, and no vending operation results. This operation is more fully described in the aforesaid copending patent application Ser. No. 533,682.

The means of sensing information on the punch card and the means of transmitting the information set on the dials to the security control device may be any means known in the art, and the particular choice means is not considered to be a part of the present invention.

FIGURE 29 illustrates a push-button panel in which a series of numbered push-buttons 390 are arranged in columnar form on a panel 388. Opposite each push-button 390 is a commodity-identification strip 392 identifying the corresponding product by name and by price per unit or per stated number of units. At conveniently spaced locations, category-identification panels 394 may be provided. For example, items 1 through 10 might be preceded by the heading "pills" and items 1 and 2 might be two different brands of headache remedy costing 51 cents and 58 cents per package respectively. Category identification panels 394 are shown in FIGURE 29 as placed at the beginning of every 10 commodities but any other convenient arrangement, to suit the product available, might be made.

Each push-button 390, when pressed, closes a corresponding switch SS-1, SS-2 etc. as described with reference to FIGURE 13, and also closes a corresponding switch G-1, G-2, etc., as described with reference to FIGURE 17. If desired, delay or holding means may be provided for each push-button 390 so that the switches SS-1, etc., and G-1, etc., remain closed for a predetermined period of time, or until the vending operation is complete.

Another alternative product selection arrangement (not shown) could involve the use of a standard-form card having positioned points which, may be checked off by the customer by means of a suitable pencil or other implement. The positioned points correspond in predetermined manner to the products available, and those products whose corresponding points have been checked off will be dispensed to the customer. Known sensing methods and apparatus are commercially available to implement this alternative.

It will be clear to those skilled in the art that the identification and selection devices described with reference to FIGURES 21 through 29 inclusive are exemplary only and are not to be considered as restrictive of the invention. Basically, the invention requires only a means of selecting the items of merchandise, so as to close corresponding switches, and a means of identifying the purchaser if a credit rather than a cash operation is desired.

What I claim as my invention is:

1. Vending apparatus comprising a plurality of dispensers for simultaneously dispensing a corresponding plurality of commodities, dispenser control means having individually operable subunits for actuating selected ones of said dispensers, a commodity selector for selectively and simultaneously rendering operative said subunits of the dispenser control means so as to actuate selected ones of said dispensers, an identification sensing control device responsive to registration of the identity of the purchaser by purchaser identification means for rendering the dispenser control means operative only when the purchaser identification means registers information representative of the identity of the purchaser in the identification sensing control device, a price control device operatively associated with the commodity selector and adapted to register the price of each of the commodities selected by the commodity selector, invoicing means responsive to the price control means and adapted to sum the prices of the commodities selected for dispensing, and means responsive to the invoicing means and the purchaser identification means for recording the sum total of the prices of the products dispensed and the identity of the purchaser.

2. Apparatus as defined in claim 1, in which the commodity selector is an array of push button switches each switch corresponding to a particular commodity and actuating the dispenser for the corresponding commodity.

3. Apparatus as defined in claim 1, wherein the customer is identified by a numerical code punched on a punch card, and the identification sensing control device responds to the information punched on the punch card when the punch card is inserted in the identification sensing control device.

4. Apparatus as defined in claim 1, wherein the identity of the customer is registered by the customer by means of a dial combination to which the identification sensing control device responds.

5. Apparatus as defined in claim 1, additionally including station identification means for providing information identifying the particular location or operator of the vending apparatus actuated, and wherein the recording means responds to the station identification means to record the information provided by the station identification means to record the information provided by the station identification means.

6. Apparatus as defined in claim 1, wherein the recording means prints on an invoice the said sum total of the prices and information representing the purchaser's identity, date of purchase, and station.

7. Apparatus as defined in claim 1, wherein the purchaser identification means is a credit card bearing physical characteristics representative of a code number identifying the purchaser using the credit card.

8. Apparatus as defined in claim 1, wherein the commodity selector and purchaser identification means are comprised in a single card having adjustable elements which may be manually adjusted by the bearer of the card to select one or more of the commodities.

9. Vending apparatus comprising a plurality of storage means, one for each product dispensed by the vending apparatus, a dispensing member for each product associated with the corresponding storage means for such product, manually-operable switch means for each dispensing member for rendering the corresponding dispensing member operative, said storage units being located in a bank, a dispensing mechanism associated with such bank and responsive to the registration of customer identification means and product selection means to impart a vending movement simultaneously to those of the dispensing members which have been rendered operative in response to manual setting of selected ones of said switch means, and delivery means for delivering the dispensed products to a receiving station accessible to the customer.

10. Apparatus as defined in claim 9, wherein the dispensing mechanism makes a reciprocal vending movement and is adapted to make contact in one direction of the reciprocal movement with each of the dispensing members for which the corresponding switch means has been actuated, thereby to cause the dispensing of the commodities selected.

11. Apparatus as defined in claim 10, wherein each storage means contains a plurality of vendible units of the corresponding product arranged sequentially in or on the storage means whereby, for each selected product, upon the dispensing motion, the dispensing mechanism moves all of said product units in or on the storage device towards the delivery means through a distance substantially equal to the width of one of said product units plus the spacing between adjacent product units in or on the storage unit, thereby to dispense that product unit nearest the delivery means.

12. Apparatus as defined in claim 11, wherein there are a plurality of such banks each operated simultaneously with the others by means of a vending mechanism common to all banks.

13. Apparatus as defined in claim 11, wherein the dispensing mechanism includes, for each dispensing member, a non-return device mounted on a shaft, the shaft being reciprocated by the vending mechanism, and the non-return means moving the dispensing member forward through a distance corresponding substantially to the width of one of said product units plus the spacing between adjacent product units upon reciprocation of the shaft, when the corresponding product is selected.

14. Apparatus as defined in claim 13, wherein each of said non-return means is selectively engaged by the dispensing mechanism when contact means actuated by a solenoid responsive to the product selection means makes contact between the reciprocating vending mechanism and the non-return means.

15. Apparatus as defined in claim 11, wherein contact means for each storage means connected to the reciprocating vending mechanism and actuated by a solenoid is adapted to engage the lower most product unit in a vertical stack of such product units in said last-mentioned storage means when the solenoid is actuated by the switch means for the corresponding product.

16. Apparatus as defined in claim 11, when the at least one of said storage means is contained in a refrigerated compartment and the compartment is opened by the reciprocal movement of the vending mechanism to permit selected ones of said refrigerated products to be dispensed.

17. Apparatus as defined in claim 11, additionally including blocking means temporarily blocking the access by the purchaser to the outer most product in each of said storage means, in response to said reciprocating motion thereby to prevent the purchaser from having access to the storage means during the vending operation.

18. Apparatus as defined in claim 11, wherein the product units are sequentially mounted on hooks equally spaced along an endless chain, and wherein upon selection and vending of such product the chain is moved forward upon the dispensing reciprocal operation to permit the outermost product unit to drop from its associated hook and to move the other product units through a distance corresponding to the distance betwen adjacent product units on adjacent hooks on said chain.

19. Vending apparatus comprising a multi-layer stepping switch, means for stopping said stepping switch sequentially at preselected positions thereof, means for recording information representative of customer identity at one preselected switch position of said stepping switch, means for recording predetermined information at other preselected positions of said stepping switch, means for sequentially recording the price of selected vended products in one or more other preselected positions of said stepping switch, and means for recording the total of the prices in another preselected position of the stepping switch.

20. Apparatus as defined in claim 19, including invoice printing means for printing the information recorded on an invoice, and wherein the stepping switch is caused to step from one position to the next following position by the actuation of switch means responsive to the printing of said information on an invoice, the information recorded at each position being fed to the printing means at said last-mentioned position of said stepping switch.

21. Apparatus as defined in claim 20, wherein the prices of products are recorded sequentially by means of a second multi-layer stepping switch, each position on the second steping switch corresponding to a discrete one of the products available for vending, and each position of the stepping switch being connected to a price indicator for the corresponding product; and having means interconnecting the price indicator for each product through the corresponding stepping switch position to an adding unit, whereby if the stepping switch is stopped at a position corresponding to one of said products the price thereof is recorded and added by the adding unit; and having means responsive to stopping of the second stepping switch in any one of its positions for actuating the vending operation resulting in the vending of the corresponding product to the purchaser.

22. Apparatus as defined in claim 21, additionally including means for rendering the adding means inoperative when the product is out of stock.

23. Apparatus as defined in claim 22, wherein information identifying the product out of stock is printed in red on the invoice.

24. Apparatus as defined in claim 9, additionally comprising a multilayer stepping switch, means for stopping said stepping switch sequentially at preselected positions thereof, means for recording information representative of customer identity at one preselected switch position of said stepping switch, means for recording predetermined information at other preselected positions of said stepping switch, means for sequentially recording the price of selected vended products in one or more other preselected positions of said stepping switch, and means for recording the total of the prices in another preselected position of the stepping switch.

25. Apparatus as defined in claim 24, including invoice printing means for printing the information recorded on an invoice, and wherein the stepping switch is caused to step from one position to the next following position by the actuation of switch means responsive to the printing of said information on an invoice, the information recorded at each position being fed to the printing means at said last-mentioned position of said stepping switch.

26. Apparatus as defined in claim 25, wherein the prices of products are recorded sequentially by means of a second multi-layer stepping switch, each position on the second stepping switch corresponding to a discrete one of the products available for vending, and each position of the second stepping switch being connected to a price indicator for the corresponding product; and having means interconnecting the price indicator for each product through the corresponding stepping switch position to an adding unit, whereby if the stepping switch is stopped at a position corresponding to one of said products the price thereof is recorded and added by the adding unit; and having means responsive to stopping of the second stepping switch in any one of its positions for actuating the vending operation resulting in the vending of the corresponding product to the purchaser.

27. Vending apparatus comprising a plurality of merchandise storage units each storing at least one of a predetermined item of merchandise, a dispensing member associated with each said storage unit, dispenser control means associated with each dispensing member for actuating such dispensing, a portable commodity selector for simultaneously actuating the selected dispenser control means and provided with a plurality of selector elements each corresponding to a unique one of the dispenser control means, the dispenser control means being engageable with the commodity selector and responsive to the selector elements whereby corresponding ones of said dispensing members are actuated to simultaneously dispense selected items of merchandise.

28. Apparatus as defined in claim 27 wherein the dispensing members dispense the selected products of merchandise substantially simultaneously.

29. Apparatus as defined in claim 27 wherein the control elements are punched holes in a card.

30. Apparatus as defined in claim 27, additionally including accounting means responsive to the dispensing of merchandise to provide a record of the products dispensed.

31. Apparatus as defined in claim 1, wherein the subunits selected are simultaneously rendered operative so as to actuate simultaneously selected ones of said dispensers.

32. Apparatus as defined in claim 31 wherein the commodity selector is a card having a predetermined array of holes corresponding positionally to the selected commodities, and wherein the sub-units are rendered operative to actuate selected ones of said dispensers by the presence of corresponding holes in the punched card.

33. Apparatus as defined in claim 3, wherein the commodity selector and purchaser identification means are comprised in a single card in which holes may be punched in a predetermined array by the user of the vending apparatus thereby to select products having a predetermined correspondence to the array of holes punched in the card.

34. Apparatus as defined in claim 27, wherein there are provided a plurality of said commodity selectors each having a plurality of selector elements each of which selector elements corresponds to a unique one of said items of merchandise, whereby each of a plurality of persons may simultaneously register merchandise selections on a unique one of said commodity selectors.

35. Apparatus as defined in claim 1, wherein there are provided a plurality of said commodity selectors each having a plurality of selector elements each of which selector elements corresponds to a unique one of said commodities, whereby a plurality of persons may simultaneously register commodity selections on a unique one of said selector control devices.

36. Apparatus as defined in claim 35 wherein each of the said plurality of selector control devices is portable and each is adapted to engage a mating stationary receptacle associated with the said dispenser control means.

37. A vending machine comprising a plurality of merchandise magazines of the type adapted to dispense one or more items of merchandise upon the imparting of a vending movement to an actuating member associated therewith; dispenser control means associated with each of said magazines for rendering said vending movement operative or inoperative in respect of the magazine with which it is associated; a commodity selector for said dispenser control means having a plurality of selector elements and adapted to conform the states of all said dispenser control means to corresponding states of corresponding selector elements of the commodity selector whereby merchandise is selected in response to the states of said selector elements; manually adjustable price setting means representing the price of an item of merchandise in each said magazine; printing means; printing control means associated with said printing means and price setting means and adapted in response to the vending of merchandise to print consecutively the identity and price of each item of merchandise selected in conformity with the selection made by said selector control device and the totals to form an invoice for the selected merchandise; power operated means for imparting the vending movement to the actuating members associated with all selected magazines substantially simultaneously.

38. Vending apparatus comprising a plurality of merchandise storage units, a dispensing member associated with each said storage unit, dispenser control means associated with each dispensing member, a commodity selector operable by a purchaser to actuate any number of the dispenser control means, the dispensing members associated with such selected dispenser control means substantially simultaneously dispensing selected products of merchandise, and accounting means responsive to the selection or dispensing of merchandise to provide a record of the products dispensed.

39. A vending machine comprising: a plurality of merchandise magazines of the type adapted to dispense one or more items of merchandise upon the imparting of a vending movement to an actuating member associated therewith; dispenser control means associated with each of said magazines for rendering said venting movement operative or inoperative in respect of the magazine with which it is associated; a commodity selector for said dispenser control means adapted to conform the states of all said dispenser control means to corresponding states of corresponding selector elements of the commodity selector whereby merchandise is selected in response to the states of said selector elements, manually adjustable price setting means representing the price of an item of merchandise in each said magazine; printing means; printing control means associated with said printing means and price setting means, and adapted to print consecutively the identity and price of each item of merchandise selected in conformity with the selection made by said selector control device and the totals to form an invoice for the selected merchandise; power operated means for imparting the vending movement to the actuating members associated with all selected magazines simultaneously; actuating means for said printing control device and said power operated means, whereby all the selected merchandise is vended substantially simultaneously and an invoice printed, and conveyor means to collect the vended merchandise and transport it to a vending station.

40. Apparatus as defined in claim 27, wherein a plurality of dispensers include a quantity of the same item of merchandise and are selectively actuated in response to a single one of said commodity selector sub-units, at least one of said last mentioned dispensers being provided with an empty switch which changes position when the corresponding dispenser is void of merchandise whereby to render inoperative said corresponding dispenser and to transfer the selection and dispensing operations for such item of merchandise to another of the said last mentioned plurality of dispensers.

41. Apparatus as defined in claim 29, additionally comprising accounting means responsive to the dispensing of merchandise to provide a record of the products dispensed.

References Cited

UNITED STATES PATENTS

| 2,353,002 | 7/1944 | Armbruster | 221—295 X |
|---|---|---|---|
| 3,139,214 | 6/1964 | Steen. | |
| 3,172,519 | 3/1965 | Albright et al. | 221—125 X |
| 3,173,530 | 3/1965 | Lord | 221—240 X |
| 3,254,749 | 6/1966 | Scherer | 194—4 |
| 2,678,250 | 5/1954 | Heinig | 221—80 |
| 1,872,110 | 8/1932 | Brand | 194—4 X |
| 2,970,877 | 2/1961 | Parsons et al. | 186—1.2 X |

STANLEY H. TOLLBERG, Primary Examiner

U.S. Cl. X.R.

186—1.2; 221—2